(12) United States Patent
Choi et al.

(10) Patent No.: US 11,303,391 B2
(45) Date of Patent: Apr. 12, 2022

(54) METHOD AND APPARATUS FOR TRANSMITTING UPLINK CHANNELS IN WIRELESS COMMUNICATION SYSTEM

(71) Applicant: Samsung Electronics Co., Ltd., Suwon-si (KR)

(72) Inventors: Seunghoon Choi, Suwon-si (KR); Jinkyu Kang, Suwon-si (KR); Youngbum Kim, Suwon-si (KR); Taehyoung Kim, Suwon-si (KR); Sungjin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 16/861,969

(22) Filed: Apr. 29, 2020

(65) Prior Publication Data

US 2020/0351025 A1    Nov. 5, 2020

(30) Foreign Application Priority Data

May 3, 2019  (KR) .................. 10-2019-0052280

(51) Int. Cl.
*H04W 72/12*   (2009.01)
*H04L 1/18*    (2006.01)
(Continued)

(52) U.S. Cl.
CPC .......... *H04L 1/1812* (2013.01); *H04L 1/0693* (2013.01); *H04L 1/1887* (2013.01);
(Continued)

(58) Field of Classification Search
CPC ... H04L 1/1812; H04L 5/0055; H04L 1/1887; H04L 1/0693; H04L 1/0026;
(Continued)

(56) References Cited

U.S. PATENT DOCUMENTS

| 9,774,422 B2 | 9/2017 | Fu et al. |
| 10,045,339 B2 | 8/2018 | Wei et al. |

(Continued)

FOREIGN PATENT DOCUMENTS

| WO | 2013/157844 A1 | 10/2013 |
| WO | 2015/024423 A1 | 2/2015 |

OTHER PUBLICATIONS

Lenovo et al., 'Multiplexing of SR and HARQ-ACK', R1-1800396, 3GPP TSG RAN WG1 Meeting AH 1801, Vancouver, Canada, Jan. 12, 2018, pp. 1-4.

(Continued)

*Primary Examiner* — Edan Orgad
*Assistant Examiner* — Malick A Sohrab
(74) *Attorney, Agent, or Firm* — Jefferson IP Law, LLP

(57) ABSTRACT

A communication method and a system for converging a $5^{th}$-Generation (5G) communication system for supporting higher data rates beyond a $4^{th}$-Generation (4G) system with a technology for Internet of Things (IoT) are provided. The disclosure may be applied to intelligent services based on the 5G communication technology and the IoT-related technology, such as smart home, smart building, smart city, smart car, connected car, health care, digital education, smart retail, security and safety services. The disclosure provides a method and an apparatus for an uplink transmission process.

12 Claims, 10 Drawing Sheets

(51) Int. Cl.
    *H04L 5/00*       (2006.01)
    *H04W 72/04*     (2009.01)
    *H04W 74/00*     (2009.01)
    *H04L 1/06*       (2006.01)

(52) U.S. Cl.
    CPC ....... *H04L 5/0055* (2013.01); *H04W 72/0406* (2013.01); *H04W 72/0446* (2013.01); *H04W 72/1284* (2013.01); *H04W 74/004* (2013.01)

(58) Field of Classification Search
    CPC ..... H04L 1/1861; H04L 5/001; H04L 5/0044; H04L 5/005; H04L 5/0094; H04W 72/1284; H04W 72/0406; H04W 74/004; H04W 72/0446; H04W 72/042; H04W 72/0493
See application file for complete search history.

(56) References Cited

U.S. PATENT DOCUMENTS

| | | | |
|---|---|---|---|
| 2010/0098012 A1* | 4/2010 | Bala | H04L 5/0053 370/329 |
| 2013/0301600 A1 | 11/2013 | Park | |
| 2019/0103947 A1* | 4/2019 | Park | H04L 1/1812 |
| 2019/0239216 A1* | 8/2019 | Kundu | H04L 5/0053 |
| 2020/0068599 A1* | 2/2020 | Yang | H04L 5/0055 |
| 2020/0351916 A1* | 11/2020 | Khoshnevisan | H04W 72/10 |
| 2021/0211241 A1* | 7/2021 | Xiong | H04W 72/042 |

OTHER PUBLICATIONS

Vivo, 'Draft TS 38.213 CR on multiplexing HARQ-ACK/SR/CSI in PUCCH', R1-1903718, 3GPP TSG RAN WG1 Meeting #96, Athens, Greece, Mar. 3, 2019, pp. 1-4.
International Search Report dated Aug. 11, 2020, issued in International Patent Application No. PCT/KR2020/005793.

\* cited by examiner

METHOD AND APPARATUS FOR TRANSMITTING UPLINK CHANNELS IN WIRELESS COMMUNICATION SYSTEM

CROSS-REFERENCE TO RELATED APPLICATION(S)

This application is based on and claims priority under 35 U.S.C. 119(a) of a Korean Patent Application number 10-2019-0052280, filed on May 3, 2019, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for transmitting uplink transmission channels in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'. The 5G communication system established by the 3rd generation partnership project (3GPP) is called a new radio (NR) system.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques have been discussed and adopted in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As various services can be provided according to the development of the above-described wireless communication system, a method for effectively providing such services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to improve an uplink transmission method, and the disclosure proposes a method for effectively providing various services.

Another aspect of the disclosure is to provide a service can be effectively provided in a wireless communication system, and uplink transmission and reception processes can be improved.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes identifying a plurality of resources for hybrid automatic repeat request acknowledgements (HARQ-ACKs) to be transmitted in a slot; identifying whether an uplink transmission overlaps with a first resource for a HARQ-ACK in the slot among the plurality of resources for HARQ-ACKs; and transmitting the HARQ-ACK to a base station based on the identification.

In accordance with another aspect of the disclosure, a method performed by a base station in a wireless communication system is provided. The method includes transmitting, to a terminal, downlink transmissions; identifying a plurality of resources for hybrid automatic repeat request acknowledgements (HARQ-ACKs) to be received in a slot; and receiving, from the terminal, a HARQ-ACK based on an identification of whether an uplink transmission overlaps with a first resource for the HARQ-ACK in the slot among the plurality of resources for HARQ-ACKs.

In accordance with another aspect of the disclosure, a terminal in a wireless communication system is provided. The terminal includes a transceiver configured to transmit and receive a signal; and a controller configured to: identify a plurality of resources for hybrid automatic repeat request acknowledgements (HARQ-ACKs) to be transmitted in a slot, identify whether an uplink transmission overlaps with a first resource for a HARQ-ACK in the slot among the plurality of resources for HARQ-ACKs, and transmit the HARQ-ACK to a base station based on the identification.

In accordance with another aspect of the disclosure, a base station in a wireless communication system is provided. The base station includes a transceiver configured to transmit and receive a signal; and a controller configured to: transmit, to a terminal, downlink transmissions, identify a plurality of resources for hybrid automatic repeat request acknowledgements (HARQ-ACKs) to be received in a slot, and receive, from the terminal, a HARQ-ACK based on an identification of whether an uplink transmission overlaps with a first resource for the HARQ-ACK in the slot among the plurality of resources for HARQ-ACKs.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
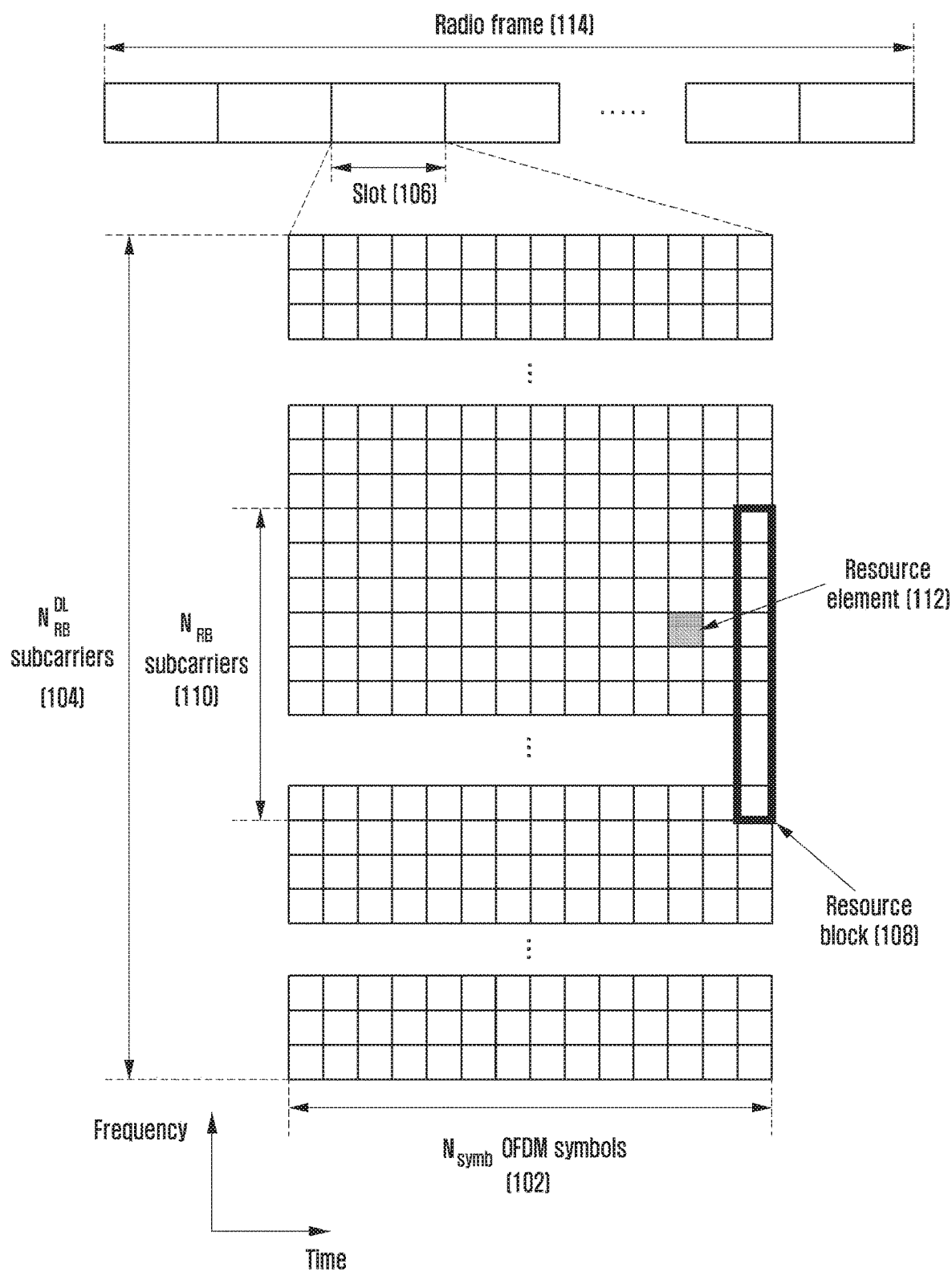
FIG. 1 illustrates a transmission structure of a time-frequency domain, which is a radio resource region of a 5G or NR system, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more such surfaces.

For the same reason, in the accompanying drawings, some elements are exaggerated, omitted, or schematically illustrated. Further, the size of each element does not entirely reflect the actual size. The same reference numerals are assigned to the same or corresponding elements in each drawing.

The advantages and features of the disclosure and a method of achieving the same should become clear with embodiments described in detail below with reference to the accompanying drawings. However, the disclosure is not limited to the embodiments disclosed below, but may be implemented in various different forms. The embodiments make the disclosure complete and are provided to completely inform a person skilled in the art to which the disclosure belongs of the scope of the disclosure. The scope of the disclosure is defined only by the appended claims. The same or like reference numerals refer to the same or like elements throughout the specification.

Here, it will be understood that each block of the process flowchart drawings and combinations of the flowchart drawings can be performed by computer program instructions. These computer program instructions can be provided to a processor of a general purpose computer, special purpose computer, or other programmable data processing equipment to produce a machine, such that the instructions, which are executed via the processor of the computer or other programmable data processing equipment, create means for implementing the functions specified in the flowchart block(s). These computer program instructions may also be stored in a computer usable or computer-readable memory that can direct a computer or other programmable data processing equipment to function in a particular manner, such that the instructions stored in the computer usable or computer-readable memory produce an article of manufacture including instruction means that implement the function specified in the flowchart block(s). The computer program instructions may also be loaded onto a computer or other programmable data processing equipment to cause a series of operations to be performed on the computer or other programmable data processing equipment to produce a computer-implemented process such that the instructions that are executed on the computer or other programmable data processing equipment provide operations for implementing the functions specified in the flowchart block(s).

In addition, each block of the flowchart drawings may represent a module, segment, or portion of code, which includes one or more executable instructions for implementing the specified logical function(s). It should also be noted that in some alternative implementations, the functions noted in the blocks may occur out of the given order. For example, two blocks shown in succession may in fact be executed substantially concurrently or the blocks may sometimes be executed in the reverse order, depending upon the corresponding function.

The term "~unit" as used in embodiments of the disclosure means a software or hardware element, such as a field-programmable gate array (FPGA) or an application specific integrated circuit (ASIC), and the "~unit" performs functions. However, the "~unit" does not always have a meaning limited to software or hardware. The "~unit" may be configured either to be stored in an addressable storage medium or to execute one or more processors. Therefore, for example, the "~unit" includes elements such as software elements, object-oriented software elements, class elements or task elements, processes, functions, properties, procedures, sub-routines, segments of a program code, drivers, firmware, micro-codes, circuits, data, database, data structures, tables, arrays, and parameters. Functions provided by elements and components "~units" may be formed by combining the small number of elements and components "~units" or may be divided into additional elements and components "~units". In addition, elements and components "~units" may also be implemented to execute one or more CPUs within a device or a security multimedia card. Further, in the embodiment, the "~unit" may include one or more processors.

A wireless communication system has been developed from an initial wireless communication system providing a voice-oriented service to a broadband wireless communication system providing a high-speed and high-quality packet data service, such as those according to communication standards including high speed packet access (HSPA), long term evolution (LTE) (or evolved universal terrestrial radio access (E-UTRA)), and LTE-advanced (LTE-A) defined in the 3GPP, high rate packet data (HRPD) and ultra mobile broadband (UMB) defined in the 3GPP2, and 802.16e defined in the IEEE. In addition, a 5G or NR communication standard has been established for a 5th generation wireless communication system.

As a typical example of the broadband wireless communication system, a 5G or NR system has adopted an orthogonal frequency division multiplexing (OFDM) scheme in a downlink (DL) and an uplink. More specifically, a cyclic-prefix OFDM (CP-OFDM) scheme is adopted in the downlink, and a discrete Fourier transform spreading OFDM (DFT-S-OFDM) scheme is adopted along with the CP-OFDM scheme in the uplink. The uplink refers to a radio link through which a terminal (user equipment (UE) or a mobile station (MS)) transmits data or a control signal to a base station (BS) (gNode B, eNode B, or BS), and the downlink refers to a radio link through which the base station transmits data or a control signal to the terminal. In such a multiple access scheme, normally, assigning and operating are performed such that time-frequency resources for transmission of data or control information for each user do not overlap with each other, that is, orthogonality is established. Therefore, each user's data or control information can be identified.

The 5G or NR system adopts a HARQ scheme in which corresponding data is retransmitted in a physical layer when a decoding failure occurs in initial transmission. The HARQ scheme refers to a scheme in which when a receiver fails to correctly decode data, the receiver transmits information (negative acknowledgement (NACK)) informing a transmitter of the decoding failure, so as to enable the transmitter to retransmit the corresponding data in the physical layer. The receiver increases data reception performance by combining the data retransmitted by the transmitter with the data that has previously failed to be decoded. In addition, when the receiver correctly decodes data, the receiver transmits information (acknowledgment (ACK)) informing the transmitter of a decoding success, so as to enable the transmitter to transmit new data.

Meanwhile, the NR system, which is a new 5G communication system, is designed to allow various services to be freely multiplexed in time and frequency resources. Accordingly, waveform/numerology and a reference signal can be dynamically or freely allocated according to the needs of a corresponding service. In wireless communication, in order to provide an optimal service to a terminal, optimized data transmission through measurement of channel quality and interference amount is important, and thus accurate channel state measurement is necessary. However, unlike 4G communication in which channel and interference characteristics are not significantly changed according to frequency resources, since the channel and interference characteristics are significantly changed according to services in the case of a 5G or NR channel, it is necessary to support a subset of frequency resource group (FRG) level, which enables separate measurement. Meanwhile, in the 5G or NR system, the types of supportable services may be divided into categories such as eMBB, mMTC, and URLLC. The eMBB aims for high-speed transmission of high-capacity data, the mMTC aims for minimization of power of the terminal and access by multiple terminals, and the URLLC aims for high reliability and low latency. Depending on the type of service applied to the terminal, different requirements may be applied.

Since the URLLC service among the above-described services aims for high reliability and low latency, there may be a need to transmit control information and data information which can be transmitted through a physical channel at a low coding rate. In the case of control information, a repetitive transmission function of control information has already been introduced in an MTC or narrow band Internet-of-Things (NB-IoT) service of the LTE. The purpose of the introduction is to provide high coverage for terminals having a small bandwidth, and thus latency has not been sufficiently considered. In addition, the minimum unit for control information repetitive transmission is fixed in the unit of a sub-frame based on the LTE.

In order to support the URLLC service in the NR or 5G system, it is required to introduce a control information repetitive transmission mode which can improve reliability while requiring low latency. Accordingly, the disclosure basically considers a situation in which control information is repeatedly transmitted within a slot. Additionally, the disclosure also considers a situation in which control information which can be transmitted over a slot boundary is repeatedly transmitted. Through operations provided in the disclosure, a terminal can detect control information transmitted from a base station with high reliability in a faster time.

In the disclosure, each term is defined in consideration of each function, and may vary according to a user's or operator's intention or practice. Therefore, the definition should be made based on the contents throughout the specification. Hereinafter, a base station, as a subject which performs resource allocation of a terminal, may include at least one of a next generation node B (gNodeB (gNB)), an evolved node B (eNode B (eNB)), a Node B, a base station (BS), a radio access unit, a base station controller, or a node on the network. The terminal may include a user equipment (UE), a mobile station (MS), a cellular phone, a smart phone, a computer, or a multimedia system capable of performing a communication function. In the disclosure, a downlink (DL) refers to a wireless transmission path of a signal transmitted by the base station to the terminal, and an uplink (UL) refers to a wireless transmission path of a signal transmitted by the terminal to the base station. In addition, hereinafter, the disclosure describes the NR system as an example, but is not limited thereto, and embodiments of the disclosure may be applied to various communication systems having similar technical backgrounds or channel types. In addition, an embodiment of the disclosure may be applied to other communication systems through some modifications within a range which does not significantly depart from the scope of the disclosure, as determined by a person having skilled technical knowledge.

In the disclosure, the terms "physical channel" and "signal" can be used interchangeably with "data" or "control signal". For example, a physical downlink shared channel (PDSCH) is a physical channel through which data is transmitted, but the PDSCH may also be referred to as data in the disclosure.

In the disclosure, higher layer signaling may be a signal transmission method of transmitting a signal from a base station to a terminal by using a downlink data channel of a physical layer or from the terminal to the base station by using an uplink data channel of the physical layer, and may be referred to as radio resource control (RRC) signaling or a medium access control (MAC) control element (CE).

Meanwhile, as research on a next-generation communication system has recently been conducted, various methods for scheduling communication with a terminal are being discussed. Accordingly, an efficient scheduling and data transmission/reception method considering characteristics of a next-generation communication system is required. Accordingly, in order to provide a plurality of services to a user in the communication system, there is a need for a method capable of providing each service within the same time interval according to characteristics of a corresponding service, and an apparatus using the same.

Hereinafter, the disclosure describes a method and an apparatus for transmitting HARQ-ACK feedback for downlink data transmission. Specifically, a method for configuring HARQ-ACK feedback bits when a terminal intends to transmit multiple HARQ-ACKs within one slot through an uplink is described.

In the wireless communication system, particularly, the new radio (NR) system, a base station may configure one component carrier (CC) or a plurality of component carriers for downlink transmission to a terminal. In addition, downlink transmission and uplink transmission slots and symbols may be configured in each CC. Meanwhile, when a PDSCH, which is downlink data, is scheduled, downlink control information (DCI) may transmit at least one of slot timing information to which the PDSCH is mapped, information on a start symbol position to which the PDSCH is mapped in a corresponding slot, and information on the number of symbols to which the PDSCH is mapped, through a specific bit field. For example, when the DCI is transmitted in slot n and the PDSCH is scheduled, if K0, which is slot timing information in which the PDSCH is transmitted, indicates 0, the start symbol position is 0, and a symbol length is 7, the corresponding PDSCH is mapped to 7 symbols from symbol 0 in slot n and transmitted. Meanwhile, a PDSCH, which is a downlink data signal, is transmitted, and HARQ-ACK feedback is transmitted from the terminal to the base station after slot K1. K1 information, which is timing information in which HARQ-ACK is transmitted, may be transmitted in the DCI, and a candidate set of possible K1 values may be transmitted by higher layer signaling, and determined as one of the values in DCI.

When a semi-static HARQ-ACK codebook is configured for the terminal, the terminal may determine a feedback bit (or an HARQ-ACK codebook size) required to be transmitted, based on a table including K0 which is slot information to which a PDSCH is mapped, start symbol information, and information on the number or length of symbols, and K1 candidate values which are HARQ-ACK feedback timing information for the PDSCH. The table including the slot information to which the PDSCH is mapped, the start symbol information, and the information on the number or length of symbols may have a default value, and there may also be a table that the base station can set for the terminal.

When a dynamic HARQ-ACK codebook is configured for the terminal, the terminal may determine a HARQ-ACK feedback bit (or an HARQ-ACK codebook size) required to be transmitted by the terminal according to downlink assignment indicator (DAI) information included in the DCI in a slot in which HARQ-ACK information is transmitted by a K1 value which is HARQ-ACK feedback timing information for the PDSCH and K0 which is slot information to which the PDSCH is mapped.

In the disclosure, one or more PUCCHs including HARQ-ACK may be transmitted in one slot in a situation in which the terminal performs transmission of one or more HARQ-ACKs in one slot. The PUCCHs and another PUCCH including channel information or scheduling request information may be overlappingly transmitted in a specific OFDM symbol. In this case, a method for resolving a problem of a conflict between a PUCCH and a PUCCH and operating a terminal in the above case is provided. In addition, the PUCCHs and a PUSCH for transmitting uplink data information may be overlappingly transmitted in a specific OFDM symbol. In this case, a method for resolving a problem of a conflict between a PUCCH and a PUSCH and operating a terminal in the above case is provided.

FIG. 1 illustrates a transmission structure of a time-frequency domain which is a radio resource region of a 5G or NR system according to an embodiment of the disclosure.

Referring to FIG. 1, in a radio resource region, the horizontal axis indicates a time domain, and the vertical axis indicates a frequency domain. A minimum transmission unit in the time domain is an OFDM symbol, and $N_{symb}$ number of OFDM symbols 102 are gathered to form one slot 106. The length of a sub-frame may be defined as 1.0 ms, and a radio frame 114 may be defined as 10 ms. A minimum transmission unit in the frequency domain is a sub-carrier, and the bandwidth of the entire system transmission band may be configured by a total of $N_{BW}$ number of sub-carriers 104. However, such a specific value may be variably applied according to systems.

A basic unit of the time-frequency resource region is a resource element 112 (hereinafter, RE), and may be indicated by an OFDM symbol index and a sub-carrier index. A resource block 108 (hereinafter, RB) or a physical resource block (hereinafter, PRB) may be defined by $N_{symb}$ number of consecutive OFDM symbols 102 in the time domain and $N_{RB}$ number of consecutive sub-carriers 110 in the frequency domain. Therefore, one RB 108 may include $N_{symb}*N_{RB}$ number of REs 112.

In general, a minimum transmission unit of data is an RB unit. In the 5G or NR system, generally, $N_{symb}$ is 14 ($N_{symb}$=14) and $N_{RB}$ is 12 ($N_{RB}$=12), and $N_{BW}$ and $N_{RB}$ may be proportional to the bandwidth of the system transmission band. A data rate is increased in proportion to the number of RBs scheduled for a terminal. In the 5G or NR system, in the case of an FDD system operated by dividing a downlink and an uplink by frequencies, a downlink transmission bandwidth and an uplink transmission bandwidth may be different from each other. A channel bandwidth indicates an RF bandwidth corresponding to a system transmission bandwidth. The following Table 1 indicates a corresponding relationship between a system transmission bandwidth and a channel bandwidth which are defined in an LTE system that is a 4th generation wireless communication system before the 5G or NR system. For example, the LTE system having a channel bandwidth of 10 MHz has a transmission bandwidth including 50 RBs.

TABLE 1

| (Channel bandwidth) $BW_{Channel}$ [MHz] | 1.4 | 3 | 5 | 10 | 15 | 20 |
|---|---|---|---|---|---|---|
| (Transmission bandwidth configuration) NRB | 6 | 15 | 25 | 50 | 75 | 100 |

In the 5G or NR system, a terminal may operate in a wider channel bandwidth than the channel bandwidth of the LTE presented in Table 1. Table 2 indicates a corresponding relationship among a system transmission bandwidth, a channel bandwidth, and sub-carrier spacing (SCS) in the 5G or NR system.

TABLE 2

| SCS | Channel bandwidth $BW_{Channel}$ [MHz] | | | | | | | | | |
|---|---|---|---|---|---|---|---|---|---|---|
| [kHz] | 5 | 10 | 15 | 20 | 25 | 40 | 50 | 60 | 80 | 100 |
| Maximum Transmission bandwidth $N_{RB}$ | | | | | | | | | | |
| 15 | 25 | 52 | 79 | 106 | 133 | 216 | 270 | N.A. | N.A. | N.A. |
| 30 | 11 | 24 | 38 | 51 | 65 | 106 | 133 | 162 | 217 | 273 |
| 60 | N.A. | 11 | 18 | 24 | 31 | 51 | 65 | 79 | 107 | 135 |

In the 5G or NR system, scheduling information for downlink data or uplink data is transmitted from a base station to a terminal through downlink control information (DCI). The DCI may be defined according to various formats, and indicate whether the DCI is scheduling information (UL grant) for uplink data or scheduling information (DL grant) for downlink data according to each format, whether the DCI is compact DCI having a small control information size, whether to apply spatial multiplexing using multiple antennas, whether the DCI is DCI for power control, and the like. For example, DCI format 1-1, which is scheduling control information (DL grant) for downlink data, may include at least one piece of the following control information.

Carrier indicator: A carrier indicator indicates a frequency carrier in which transmission is performed.

DCI format indicator: A DCI format indicator is an indicator which distinguishes whether corresponding DCI is configured for a downlink or an uplink.

Bandwidth part (hereinafter, BWP) indicator: A BWP indicator indicates a BWP in which transmission is performed.

Frequency domain resource allocation: Frequency domain resource allocation indicates an RB of a frequency domain allocated for data transmission. A resource to be expressed is determined according to a system bandwidth and a resource allocation scheme.

Time domain resource assignment: Time domain resource assignment indicates an OFDM symbol of a slot, in which a data-related channel is to be transmitted.

VRB-to-PRB mapping: VRB-to-PRB mapping indicates a scheme for mapping a virtual RB (hereinafter, VRB) index and a physical RB (hereinafter, PRB) index.

Modulation and coding scheme (hereinafter, MCS): Modulation and coding scheme indicates a coding rate and a modulation scheme used for data transmission. That is, the modulation and coding scheme may indicate a coding rate value which can inform of channel coding information and a transport block size (TBS) together with information on whether the scheme is quadrature phase shift keying (QPSK), 16 quadrature amplitude modulation (QAM), 64 QAM, or 256 QAM.

Code block group (CBG) transmission information: CBG transmission information indicates information on a CBG which is to be transmitted when CBG retransmission is configured.

HARQ process number: HARQ process number indicates a process number of HARQ.

New data indicator: New data indicator indicates whether it is HARQ initial transmission or retransmission.

Redundancy version: Redundancy version indicates a redundancy version of HARQ.

Transmit power control (TPC) command for a physical uplink control channel (PUCCH): TPC command for a PUCCH indicates a transmit power control command for a PUCCH which is an uplink control channel.

In a case of the above-mentioned PUSCH transmission, time domain resource assignment may be transmitted by information on a slot in which a PUSCH is transmitted, start OFDM symbol position S in a corresponding slot, and the number of OFDM symbols L to which the PUSCH is mapped. The S may be a relative position from the start of a slot, the L may be the number of consecutive OFDM symbols, and the S and L may be determined from a start and length indicator value (SLIV) defined as follows.

If $(L-1) \leq 7$ then $SLIV=14*(L-1)+S$ else $SLIV=14*(14-L+1)+(14-1-S)$ where $0 < L \leq 14-S$ In the 5G or NR system, generally, a table including, in one row, information on an SLIV value, a PUSCH mapping type, and a slot in which a PUSCH is transmitted may be configured through RRC configuration. Subsequently, in the time domain resource assignment of DCI, an index value in the configured table is indicated, so that a base station may transmit, to a terminal, information on the SLIV value, the PUSCH mapping type, and the slot in which the PUSCH is transmitted.

In the 5G or NR system, the PUSCH mapping type is defined as type A and type B. In PUSCH mapping type A, the first OFDM symbol among demodulation reference signal (DMRS) OFDM symbols is located in the second or third OFDM symbol in a slot. In PUSCH mapping type B, the first OFDM symbol among the DMRS OFDM symbols is located in the first OFDM symbol in a time domain resource allocated by PUSCH transmission. The above-mentioned PUSCH time domain resource assignment method may be equally applicable to PDSCH time domain resource assignment.

The DCI may be transmitted on a physical downlink control channel (PDCCH) (or control information, hereinafter, interchangeably used), through channel coding and modulation processes.

In general, the DCI is independently scrambled with a specific radio network temporary identifier (RNTI) (or terminal identifier) for each terminal, and cyclic redundancy check (CRC) is added, and after channel coding, each DCI is configured by an independent PDCCH and transmitted. The PDCCH is mapped in a control resource set (CORESET) configured for a terminal, and transmitted.

The downlink data may be transmitted on a PDSCH which is a physical channel for downlink data transmission. The PDSCH may be transmitted after a control channel transmission interval, and scheduling information such as a modulation scheme and a specific mapping position in the frequency domain is determined based on the DCI transmitted through the PDCCH.

Among control information configuring the DCI, through the MCS, the base station notifies the terminal of the modulation scheme applied to a PDSCH to be transmitted and the size of data to be transmitted (transport block size: TBS). In an embodiment, the MCS may be configured by 5 bits or more or fewer bits than 5 bits. The TBS corresponds to the size before channel coding for error correction is applied to data (transport block: TB) to be transmitted by the base station.

In the disclosure, a transport block (hereinafter, TB) may include a MAC header, a MAC control element (CE), one or more MAC service data units (SDUs), and padding bits. Alternatively, the TB may indicate a MAC protocol data unit (PDU) or a unit of data transmitted from a MAC layer to a physical layer.

The modulation scheme supported by the 5G or NR system includes quadrature phase shift keying (QPSK), 16 quadrature amplitude modulation (QAM), 64 QAM, and 256 QAM, and each modulation order (Qm) corresponds to 2, 4, 6, or 8. That is, 2 bits per symbol for QPSK modulation, 4 bits per OFDM symbol for 16 QAM modulation, and 6 bits per symbol for 64 QAM modulation may be transmitted, and 8 bits per symbol for 256 QAM modulation may be transmitted.

In a case where time resource allocation field index m included in the DCI is indicated when the base station schedules a PDSCH or PUSCH by the DCI to the terminal in the 5G or NR system, a table indicating time domain resource assignment information shows a combination of DRMS Type A position information corresponding to m+1, PDSCH mapping type information, slot index $K_0$, data resource start symbol S, and data resource allocation length L. As an example, Table 3 is a table including time domain resource assignment information.

TABLE 3

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In Table 3, dmrs-typeA-Position is a field indicating a position of a symbol in which a DMRS is transmitted in one slot indicated by a system information block (SIB) which is one of terminal common control information. A possible value for the corresponding field is 2 or 3. When the number of symbols configuring one slot is a total of 14 and the first symbol index is 0, 2 means the third symbol and 3 means the fourth symbol. In Table 3, the PDSCH mapping type is information indicating a position of a DMRS in a scheduled data resource region. When the PDSCH mapping type is type A, the DMRS is always transmitted or received at a symbol position determined by dmrs-typeA-Position, regardless of an allocated data time domain resource. When the PDSCH mapping type is type B, the DMRS is always transmitted or received in a position of the first symbol of the allocated data time domain resource. In other words, the PDSCH mapping type B does not use dmrs-typeA-Position information. In Table 3, $K_0$ denotes offsets of a slot index to which a PDCCH through which DCI is transmitted belongs and a slot index to which a PDSCH or PUSCH scheduled in the DCI belongs. As an example, when the slot index of the PDCCH is n, the slot index of the PDSCH or PUSCH scheduled by the DCI of the PDCCH is n+$K_0$. In Table 3, S denotes a start symbol index of a data time domain resource in one slot. The range of possible S values is usually 0 to 13 based on a normal cyclic prefix. In Table 3, L denotes an interval length of the data time domain resource in one slot. The range of possible L values is 1 to 14. However, the possible values of S and L are determined by the following Equation 1 and Table 5 or Table 6. Table 3 may include values used by the terminal as a default before receiving time resource allocation information through terminal-specific or terminal-common higher layer signaling. As an example, DCI format 0_0 or 1_0 may always use Table 3 as a default time resource region value.

Table 3 includes a PDSCH time domain resource assignment value, and a K1 value is used instead of K2 for PUSCH time domain resource assignment. Table 4 below is an example of a PUSCH time domain resource assignment table.

TABLE 4

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

If $(L-1) \leq 7$ then $SLIV = 14*(L-1)+S$ else $SLIV = 14*(14-L+1)+(14-1-S)$ where $0 < L \leq 14-S$                                     Equation 1

The following Table 5 is a table showing a possible combination of S and L according to whether a cyclic prefix is normal or extended and whether a PDSCH mapping type is type A or type B.

TABLE 5

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, ..., 14} | {3, ..., 14} | {0, 1, 2, 3} (Note 1) | {3, ..., 12} | {3, ..., 12} |
| Type B | {0, ..., 12} | {2, 4, 7} | {2, ..., 14} | {0, ..., 10} | {2, 4, 6} | {2, ..., 12} |

Note 1:
S = 3 is applicable only if dmrs-TypeA-Position = 3

The following Table 6 is a table showing a possible combination of S and L according to whether a cyclic prefix is normal or extended and whether a PUSCH mapping type is type A or type B.

TABLE 6

| PUSCH mapping type | Normal cyclic prefix | | | Extended cyclic prefix | | |
|---|---|---|---|---|---|---|
| | S | L | S + L | S | L | S + L |
| Type A | 0 | {4, ..., 14} | {4, ..., 14} | 0 | {4, ..., 12} | {4, ..., 12} |
| Type B | {0, ..., 13} | {1, ..., 14} | {1, ..., 14} | {0, ..., 12} | {1, ..., 12} | {1, ..., 12} |

In Table 3, each index can be configured through a higher layer signaling parameter PDSCH-TimeDomainResourceAllocationList or PUSCH-TimeDomainResourceAllocationList.

PDSCH-TimeDomainResourceAllocationList is configured by one or multiple higher layer signaling parameter PDSCH-TimeDomainResourceAllocations, and PDSCH-TimeDomainResourceAllocation has $k_0$, mappingtype, and startSymbolAndLength. The range of possible values for $k_0$ is 0 to 32. The mappingtype may correspond to type A or type B. The range of possible values for startSymbolAndLength is 0 to 127. As described above, when the mappingtype is type A, a symbol position of a DMRS follows a value indicated by dmrs-typeA-Position.

PUSCH-TimeDomainResourceAllocationList is configured by one or multiple higher layer signaling parameter PUSCH-TimeDomainResourceAllocations, and PUSCH-TimeDomainResourceAllocation has $k_0$, mappingtype, and startSymbolAndLength. The range of possible values for $k_0$ is 0 to 32. The mappingtype may correspond to type A or type B. The range of possible values for startSymbolAndLength is 0 to 127. As described above, when the mappingtype is type A, a symbol position of a DMRS follows a value indicated by dmrs-typeA-Position.

The above-described PDSCH-TimeDomainResourceAllocation or PUSCH-TimeDomainResource Allocation is a time domain resource assignment method of a PDSCH or a PUSCH in one slot. Higher layer signaling aggregationFactorDL denotes the number of slots in which a PDSCH-TimeDomainResourceAllocation value applied in one slot is repeatedly transmitted. Higher layer signaling aggregationFactorUL denotes the number of slots in which a PUSCH-TimeDomainResourceAllocation value applied in one slot is repeatedly transmitted. The range of possible values for aggregationFactorDL and aggregationFactorUL is {1,2,4, 8}. For example, when aggregationFactorDL is 8, it means that one of possible PDSCH-TimeDomainResourceAllocations is repeatedly transmitted over a total of 8 slots. However, when at least a part of symbols applied to PDSCH-TimeDomainResourceAllocation in a specific slot is an uplink symbol, PDSCH transmission and reception of the corresponding slot is omitted. Similarly, when at least a part of symbols applied to PUSCH-TimeDomainResourceAllocation in a specific slot is a downlink symbol, PUSCH transmission and reception of the corresponding slot is omitted.

Next, a PUCCH will be described. First, in regard to a long PUCCH, since a control channel of a long transmission interval is used for the purpose of extending cell coverage, the long PUCCH may be transmitted in a DFT-S-OFDM scheme which is single carrier transmission, rather than OFDM transmission. Therefore, in this case, the PUCCH is required to be transmitted using only consecutive subcarriers, and frequency hopping may be configured in order to obtain a frequency diversity effect. That is, when frequency hopping is applied (frequency hopping is enabled through a higher layer signal), an uplink control channel of a long transmission interval may be configured at a position where frequency resources are spaced apart from each other. When frequency hopping is not applied (frequency hopping is disabled through a higher layer signal), a control channel may be transmitted during a transmission symbol interval of the long PUCCH at a frequency position based on transmission start PRB information and PRB number information, which are configured in a higher layer signal. A separated distance in terms of frequency is required to be smaller than a bandwidth supported by the terminal. In the front part of a slot, a PUCCH is transmitted using PRB-1, which is a transmission start PRB configured by a higher layer signal. In the rear part of the slot, in a case that frequency hopping is configured, a PUCCH is transmitted using PRB-2 spaced a frequency resource for the frequency hopping apart from PRB-1. In this discussion, a PRB is a physical resource block, which means a minimum transmission unit on the frequency side, and may be defined by 12 sub-carriers. Therefore, a frequency-side distance of PRB-1 and PRB-2 is required to be smaller than the maximum supported bandwidth of the terminal, and the maximum supported bandwidth of the terminal may be equal to or smaller than the bandwidth supported by the system.

The long PUCCH supports transmission formats such as PUCCH format 1, PUCCH format 3, and PUCCH format 4 according to the number of control information bits which can be supported, and whether terminal multiplexing is supported through Pre-DFT OCC support at the front end of IFFT. First, PUCCH format 1 is a long PUCCH format based on DFT-S-OFDM which can support control information of up to 2 bits. The control information may be configured by a combination of HARQ-ACK and a scheduling request (SR) or each of them. In PUCCH format 1, an OFDM symbol including a DMRS, which is a demodulation reference signal (or reference signal), and an OFDM symbol including control information (uplink control information: UCI), are repeatedly configured.

For example, when the number of transmission symbols of PUCCH format 1 is 8 symbols, the transmission symbols include a DMRS symbol, a UCI symbol, a DMRS symbol, a UCI symbol, a DMRS symbol, a UCI symbol, a DMRS symbol, and a UCI symbol sequentially from the first start symbol of 8 symbols. According to the structure of the DMRS symbol, the DMRS symbol is spread using an orthogonal code (or orthogonal sequence or spreading code, w_i(m)) along the time axis and a sequence corresponding to the length of 1 RB along the frequency axis within one OFDM symbol, is IFFTed, and is then transmitted.

According to the structure of the UCI symbol, d(0) is generated by BPSK-modulating 1-bit control information and QPSK-modulating 2-bit control information, the generated d(0) is scrambled by multiplying the same by a sequence corresponding to the length of 1 RB along the frequency axis, and the scrambled sequence is spread using an orthogonal code (or orthogonal sequence or spreading code, w_i(m)) along the time axis, is IFFTed, and is then transmitted. The terminal generates a sequence, based on group hopping or sequence hopping configuration received through a higher layer signal from the base station and the configured ID, and generates a sequence corresponding to the length of 1 RB by cyclic shifting the generated sequence with an initial cyclic shift (CS) value configured through the higher layer signal.

w_i(m) is given as shown in following Table 4 according to a length ($N_{SF}$) of the spreading code, wherein i denotes an index of the spreading code itself, and m denotes an index of elements of the spreading code. Here, the numbers in [ ] in Table 7 denote φ(m), for example, when the length of the spreading code is 2 and index i of the configured spreading code is 0 (i=0), spreading code w_i(m) is $w_i(0)=e^{j2\pi*0/N_{SF}}=1$, $w_i(1)=e^{j2\pi*0/N_{SF}}=1$, so that w_i(m) is [1 1] (w_i(m)=[1 1]).

TABLE 7

(Spreading code $w_i(m) = e^{j2\pi*\varphi(m)/N_{SF}}$ for PUCCH format 1)

| $N_{SF}$ | i = 0 | i = 1 | i = 2 | i = 3 | i = 4 | i = 5 | i = 6 |
|---|---|---|---|---|---|---|---|
| | | | | φ(m) | | | |
| 1 | [0] | | | | | | |
| 2 | [0 0] | [0 1] | | | | | |
| 3 | [0 0 0] | [0 1 2] | [0 2 1] | | | | |
| 4 | [0 0 0 0] | [0 2 0 2] | [0 0 2 2] | [0 2 2 0] | | | |
| 5 | [0 0 0 0 0] | [0 1 2 3 4] | [0 2 4 1 3] | [0 3 1 4 2] | [0 4 3 2 1] | | |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

Next, PUCCH format 3 is a long PUCCH format based on DFT-S-OFDM which can support control information of more than 2 bits. The control information may be configured by a combination of HARQ-ACK, channel state information (CSI), and an SR or each of them. A DMRS symbol position of PUCCH format 3 is shown in Table 8 according to whether frequency hopping is performed and an additional DMRS symbol is configured.

TABLE 8

| | DMRS position within PUCCH format ¾ transmission | | | |
|---|---|---|---|---|
| | No additional DMRS configuration | | Additional DMRS configuration | |
| PUCCH format ¾ transmission length | No frequency hopping configuration | Frequency hopping configuration | No frequency hopping configuration | Frequency hopping configuration |
| 4 | 1 | 0, 2 | 1 | 0, 2 |
| 5 | 0, 3 | | 0, 3 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |
| 11 | 2, 7 | | 1, 3, 6, 9 | |
| 12 | 2, 8 | | 1, 4, 7, 10 | |
| 13 | 2, 9 | | 1, 4, 7, 11 | |
| 14 | 3, 10 | | 1, 5, 8, 12 | |

For example, when the number of transmission symbols of PUCCH format 3 is 8 symbols, the first start symbol of 8 symbols starts with 0, and the DMRS is transmitted to the first symbol and the fifth symbol. The above table is also applied to a DMRS symbol position of PUCCH format 4 in the same manner.

Next, PUCCH format 4 is a long PUCCH format based on DFT-S-OFDM which can support control information of more than 2 bits. The control information may be configured by a combination of HARQ-ACK, CSI, and an SR or each of them. PUCCH format 4 differs from PUCCH format 3 in that in PUCCH format 4 of a plurality of terminals can be multiplexed within one RB. It is possible to multiplex PUCCH format 4 of a plurality of terminals by applying Pre-DFT OCC to the control information at the front end of the IFFT. However, the number of control information symbols that can be transmitted from one terminal decreases according to the number of terminals to be multiplexed.

Next, a short PUCCH will be described. The short PUCCH may be transmitted in both the downlink centric slot and the uplink centric slot and is generally transmitted in the last symbol of the slot or in an OFDM symbol (e.g., the last OFDM symbol, the second-to-last OFDM symbol, or the last two OFDM symbols) at the rear part. The short PUCCH can also be transmitted at an arbitrary position in the slot. The short PUCCH may be transmitted using one OFDM symbol or two OFDM symbols. Radio resources for the short PUCCH are allocated in units of PRB on the frequency side. As the allocated PRBs, one PRB or a plurality of contiguous PRBs may be allocated, or a plurality of PRBs away from the frequency band may also be allocated. The allocated PRB is required to be included in a band smaller than or equal to a frequency band supported by the terminal. In addition, in one PRB, uplink control information and a demodulation reference signal are required to be multiplexed in the frequency band. The multiplexing mapping is defined in the standard, the terminal transmits the short PUCCH according to the mapping scheme, and the base station demodulates the short PUCCH according to the mapping scheme. Alternatively, the terminal multiplexes and transmits the demodulation reference signal and the uplink control information according to a method indicated through reception of a higher layer signal. Alternatively, a method for transmitting a demodulation reference signal may be determined according to the number of bits of uplink control information. When the number of bits of the uplink control information is large, it is necessary to use many resources for transmission of the uplink control information to lower a transmission code rate.

The short PUCCH supports the transmission formats such as PUCCH format 0 and PUCCH format 2 according to the number of control information bits that can be supported. First, PUCCH format 0 is a short PUCCH format based on CP-OFDM which can support control information of up to 2 bits. The control information may be configured by a combination of HARQ-ACK and an SR or each of them. PUCCH format 0 has a structure which does not transmit a DMRS but transmits only a sequence mapped to 12 sub-carriers on the frequency axis within one OFDM symbol. The terminal generates a sequence, based on group hopping or sequence hopping configuration received through a higher layer signal from the base station and the configured ID, and cyclically shifts the generated sequence based on a final CS value obtained by adding another CS value to the indicated initial CS value according to ACK or NACK to be mapped to 12 sub-carriers so as to transmit the generated sequence. For example, if the HARQ-ACK is 1 bit, as shown in the following Table 6, in a case of the ACK, the final CS is generated by adding 6 to the initial CS value, and in a case of the NACK, the final CS is generated by adding 0 to the initial CS. 0 which is the CS value for the NACK and 6 which is the CS value for the ACK are defined in the standard, and the terminal generates PUCCH format 0 according to the values all the time and transmits 1-bit HARQ-ACK. (see Table 9)

TABLE 9

| 1-bit HARQ-ACK | NACK | ACK |
|---|---|---|
| Final CS | (initial CS + 0) mod 12 = initial CS | (initial CS + 6) mod 12 |

For example, when HARQ-ACK is 2 bits, as shown in Table 7 below, in a case of (NACK, NACK), the final CS is generated by adding 0 to the initial CS value, in a case of (NACK, ACK), the final CS is generated by adding 3 to the initial CS value, in a case of (ACK, ACK), the final CS is generated by adding 6 to the initial CS value, and in a case of (ACK, NACK), the final CS is generated by adding 9 to the initial CS value. 0 which is the CS value for (NACK, NACK), 3 which is the CS value for (NACK, ACK), 6 which is the CS value for (ACK, ACK), and 9 which is the CS value for (ACK, NACK) are defined in the standard, and the terminal generates PUCCH format 0 according to the above values all the time and transmits 2-bit HARQ-ACK. (see Table 10)

If the final CS value exceeds 12, due to the CS value added according to the ACK or NACK to the initial CS value, it is obvious that the length of the sequence is 12, and therefore modulo 12 is applied.

TABLE 10

| 2-bit HARQ-ACK | NACK, NACK | NACK, ACK | ACK, ACK | ACK, NACK |
|---|---|---|---|---|
| Final CS | (initial CS + 0) mod 12 = initial CS | (initial CS + 3) mod 12 | (initial CS + 6) mod 12 | (initial CS + 9) mod 12 |

Next, PUCCH format 2 is a short PUCCH format based on CP-OFDM which can support control information of more than 2 bits. The control information may be configured by a combination of HARQ-ACK, CSI, and an SR or each of them. According to PUCCH format 2, as indicated by reference numeral 414, a position of a sub-carrier to which the DMRS is transmitted in one OFDM symbol is fixed to sub-carriers having indexes of #1, #4, #7, and #10 when the index of the first sub-carrier is #0. The control information is mapped to the remaining sub-carriers excluding the sub-carriers in which the DMRS is located by being subjected to the channel encoding and then subjected to the modulation process.

<Method in which a Terminal Transmits Control Information by Selecting one PUCCH Format Among the Short PUCCH Format and the Long PUCCH Format>

The terminal receives configuration of PUCCH resource sets through a higher layer signal. The terminal selects the configured PUCCH resource sets according to the number of control information bits. In a specific slot, the terminal selects PUCCH resource set 0 when the number of control information bits required to be transmitted is 1 to 2, selects PUCCH resource set 1 when the number of control information bits required to be transmitted is 3 to $N_2-1$, selects PUCCH resource set 2 when the number of control information bits required to be transmitted is N2 to $N_3-1$, and selects PUCCH resource set 3 when the number of control information bits required to be transmitted is $N_3$ to $N_4-1$. All of the $N_2$, $N_3$, and $N_4$ may be a higher layer signal and received from the base station by the terminal in advance.

Each PUCCH resource set includes X number of PUCCH resources, and the X number of PUCCH resources include a resource for the short PUCCH (PUCCH format 0 or PUCCH format 2) or a resource for the long PUCCH (PUCCH format 1, PUCCH format 3, or PUCCH format 4). That is, each of the configured PUCCH resources includes all information required to transmit a specific PUCCH format (PUCCH format 0, PUCCH format 1, PUCCH format 2, PUCCH format 3, or PUCCH format 4), and each PUCCH resource may be configured to transmit different PUCCH formats. X is a constant, and X may be differently configured by the higher layer signal for each PUCCH resource set. That is, PUCCH resource set 0 may be X=32, and the remaining PUCCH resource set 1, 2, and 3 may be X=8. Which of the X resources the terminal selects and whether to transmit the PUCCH format corresponding to the selected resource may be indicated through bits of a downlink control channel and may be induced through a transmission resource or a slot index of the downlink control channel, a unique ID of the terminal, and the like. Alternatively, the indication method through the downlink control channel and the induction method through the transmission resource or slot index of the downlink control channel, the unique identifier of the terminal, and the like may be combined to be indicated to the terminal.

The terminal receives or induces the indication scheme to select one PUCCH resource from the X number of PUCCH resources and transmit the control information through the corresponding PUCCH format. The PUCCH resource indication method can be applied only when the terminal can determine the PUCCH resource through the corresponding downlink control channel reception before HARQ-ACK transmission, like HARQ-ACK transmission. When the terminal does not receive the corresponding downlink control channel reception before the CSI or SR, like CSI or SR transmission, the terminal receives, in advance, the PUCCH format to be used at the time of the CSI or SR transmission and the required PUCCH resource through the higher layer signal from the base station, and in the slot for the CSI or SR transmission according to a period and offset configured by the higher layer signal from the base station, the terminal uses the configured PUCCH format in the configured PUCCH resource to transmit the CSI or SR.

Each PUCCH resource corresponding to the PUCCH format includes at least one of the following information.
- A PUCCH transmission start symbol and the number of PUCCH transmission symbols
- An index indicating the start PRB, the number of transmission PRBs, whether frequency hopping is configured, and a frequency resource of the second hop when the frequency hopping is indicated
- An initial CS value, an index of time axis orthogonal cover code (OCC), a length of Pre-DFT OCC, and an index of Pre-DFT OCC The required information and the value range are summarized by Table 11 according to the respective PUCCH formats. If a value is not required to be configured in the following Table 11 or is 1 and therefore the value range is not required, the value is marked by N.A.

TABLE 11

|  |  | PUCCH Format 0 | PUCCH Format 1 | PUCCH Format 2 | PUCCH Format 3 | PUCCH Format 4 |
| --- | --- | --- | --- | --- | --- | --- |
| Starting symbol | Configurability | ✓ | ✓ | ✓ | ✓ | ✓ |
|  | Value range | 0-13 | 0-10 | 0-13 | 0-10 | 0-10 |
| Number of symbols in a slot | Configurability | ✓ | ✓ | ✓ | ✓ | ✓ |
|  | Value range | 1, 2 | 4-14 | 1, 2 | 4-14 | 4-14 |
| Index for identifying starting PRB | Configurability | ✓ | ✓ | ✓ | ✓ | ✓ |
|  | Value range | 0-274 | 0-274 | 0-274 | 0-274 | 0-274 |
| Number of PRBs | Configurability | N.A. | N.A. | ✓ | ✓ | N.A. |
|  | Value range | N.A. (Default is 1) | N.A. (Default is 1) | 1-16 | 1-6, 8-10, 12, 15, 16 | N.A. (Default is 1) |
| Enabling a FH | Configurability | ✓ | ✓ | ✓ | ✓ | ✓ |
|  | Value range | On/Off (only for 2 symbol) | On/Off | On/Off (only for 2 symbol) | On/Off | On/Off |
| Freq.cy resource of 2$^{nd}$ hop if FH is enabled | Configurability | ✓ | ✓ | ✓ | ✓ | ✓ |
|  | Value range | 0-274 | 0-274 | 0-274 | 0-274 | 0-274 |
| Index of initial cyclic shift | Configurability | ✓ | ✓ | N.A. | ✓ | ✓ |
|  | Value range | 0-11 | 0-11 | N.A. | 0-11 | 0-11 |
| Index of time-domain OCC | Configurability | N.A. | ✓ | N.A. | N.A. | N.A. |
|  | Value range | N.A. | 0-6 | N.A. | N.A. | N.A. |
| Length of Pre-DFT OCC | Configurability | N.A. | N.A. | N.A. | N.A. | ✓ |
|  | Value range | N.A. | N.A. | N.A. | N.A. | 2, 4 |
| Index of Pre-DFT OCC | Configurability | N.A. | N.A. | N.A. | N.A. | ✓ |
|  | Value range | N.A. | N.A. | N.A. | N.A. | 0, 1, 2, 3 |

Hereinafter, with the short PUCCH, it is referred to as PUCCH format 0 or PUCCH format 2 unless specifically specified, and with the long PUCCH, it is referred to as PUCCH format 1, PUCCH format 3, or PUCCH format 4 unless specifically specified. In addition, in the disclosure, the transmission by PUCCH format X refers to the transmission by a specific PUCCH format corresponding to a PUCCH resource by using the PUCCH resource obtained by the method of the disclosure such as the indication, the induction, and the like from the base station unless specifically specified.

Figure 2:
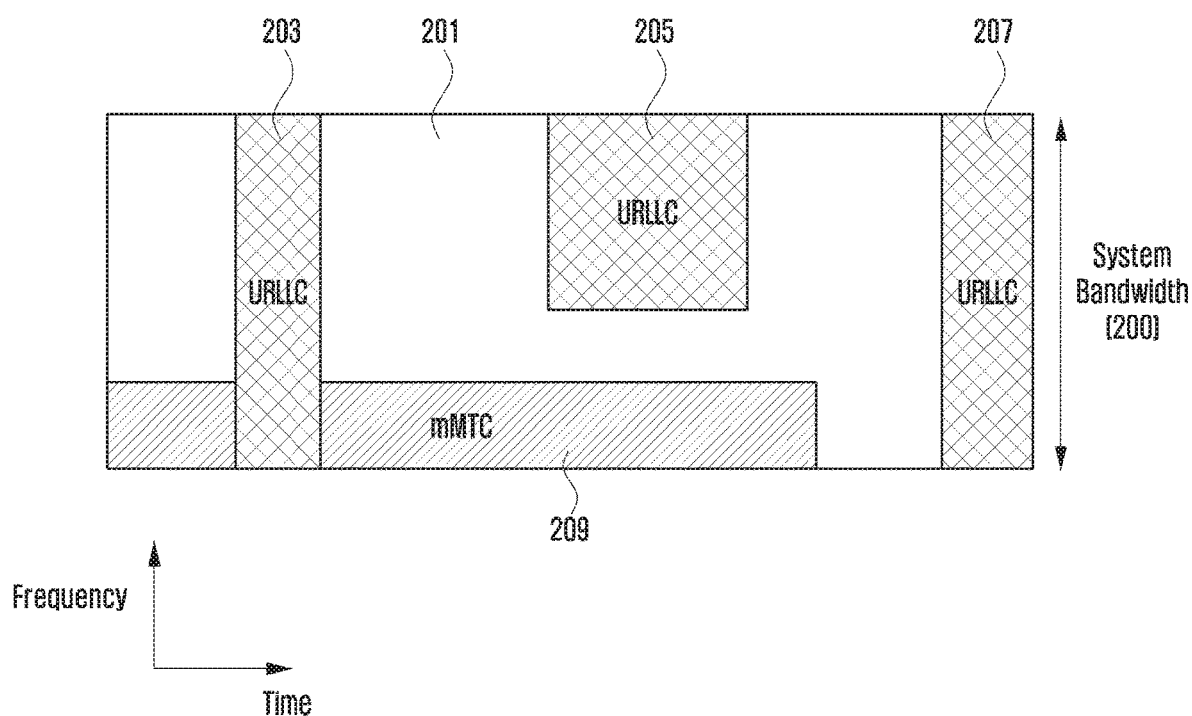
FIG. 2 illustrates a method for allocating data for an enhanced mobile broadband (eMBB), ultra-reliable and low-latency communications (URLLC), and massive machine type communications (mMTC) in a time-frequency resource region in a 5G or NR system according to an embodiment of the disclosure.

FIG. 2 is a view for explaining a method for allocating data for an eMBB, URLLC, and mMTC in a time-frequency resource region in a 5G or NR system according to an embodiment of the disclosure.

Referring to FIG. 2, the data for the eMBB, URLLC, and mMTC may be allocated in the entire system frequency band (e.g., system bandwidth) 200. When URLLC data 203, 205, and 207 are generated and are thus required to be transmitted while an eMBB 201 and an mMTC 209 are allocated and transmitted in a specific frequency band, the eMBB 201 and the mMTC 209 may transmit the URLLC data 203, 205, and 207 without emptying or transmitting a portion which has been already allocated. Among the above-described services, since the URLLC is required to reduce latency, the URLLC data may be allocated and transmitted to a part of a resource to which the eMBB or mMTC is allocated. When the URLLC is additionally allocated and transmitted in the resource to which the eMBB is allocated, eMBB data may not be transmitted in the overlapped time-frequency resource, and thus transmission performance of the eMBB data may be lowered. That is, eMBB data transmission failure due to URLLC allocation may occur.

Figure 3:
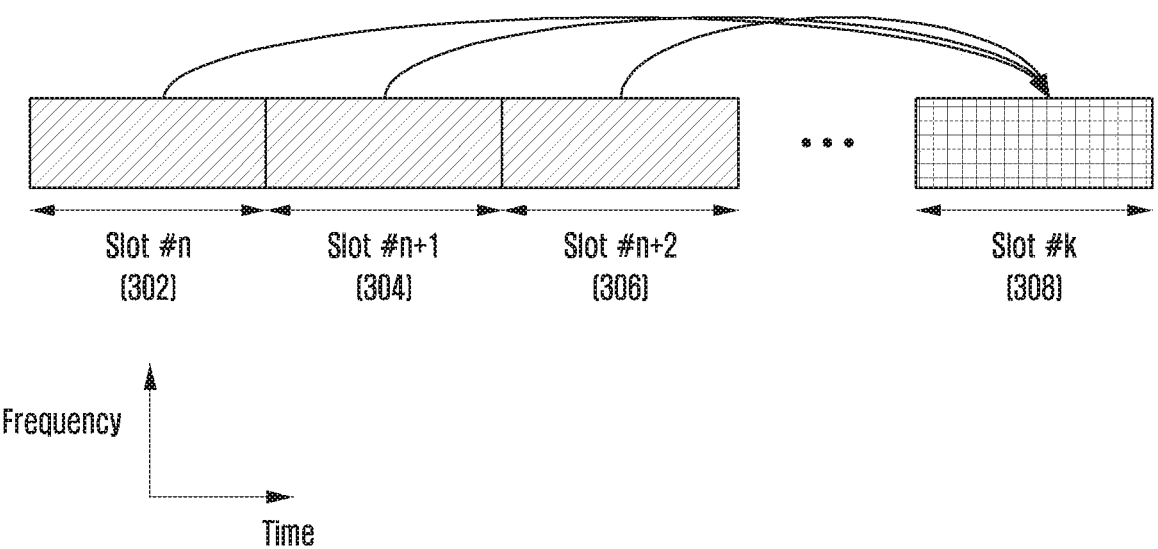
FIG. 3 illustrates a method for configuring a semi-static hybrid automatic repeat request acknowledgement (HARQ-ACK) codebook in an NR system according to an embodiment of the disclosure.

FIG. 3 illustrates a method for configuring a semi-static HARQ-ACK codebook in an NR system according to an embodiment of the disclosure.

Referring to FIG. 3, in a situation in which a HARQ-ACK PUCCH that a terminal can transmit in one slot is limited to one, if the terminal receives semi-static HARQ-ACK codebook higher layer configuration, the terminal reports HARQ-ACK information for PDSCH reception or SPS PDSCH release in a HARQ-ACK codebook in a slot indicated by a value of a PDSCH-to-HARQ_feedback timing indicator in DCI format 1_0 or DCI format 1_1. The terminal reports a HARQ-ACK information bit value in the HARQ-ACK codebook as NACK in a slot which is not indicated by a PDSCH-to-HARQ_feedback timing indicator field in DCI format 1_0 or DCI format 1_1. If the terminal reports only HARQ-ACK information for one SPS PDSCH release or one PDSCH reception in $M_{A,C}$ cases for candidate PDSCH reception, and the report is scheduled by DCI format 1_0 including information indicating that a counter DACI field is 1 in a Pcell, the terminal determines one HARQ-ACK codebook for the corresponding SPS PDSCH release or the corresponding PDSCH reception.

Otherwise, the terminal follows a HARQ-ACK codebook determination method according to the method described below.

Assuming that a set of PDSCH reception candidate occasions in serving cell c is $M_{A,c}$, $M_{A,c}$ can be obtained in the following [pseudo-code 1] operations.

[Start of Pseudo-Code 1]
Operation 1: j is initialized to 0 and $M_{A,c}$ is initialized to a null set. k, which is a HARQ-ACK transmission timing index, is initialized to 0.
Operation 2: R is configured to be a set of each row in a table including information on a slot to which a PDSCH is mapped, start symbol information, and information on the number or length of symbols. If a mapping symbol usable for a PDSCH, indicated by each value of R, is configured to be a UL symbol according to DL and UL configurations configured in a higher layer, the corresponding row is deleted from R.
Operation 3-1: If the terminal can receive one PDSCH for unicast in one slot, and R is not a null set, add one to $M_{A,c}$.
Operation 3-2: If the terminal can receive more than one PDSCH for unicast in one slot, the number of PDSCHs assignable to different symbols is counted from the calculated R and the counted number of PDSCHs is added to $M_{A,c}$.
Operation 4: k is increased by 1 to restart from operation 2.
[End of Pseudo-Code 1]

When the above-described pseudo-code 1 is described with reference to FIG. 3, in order to perform HARQ-ACK PUCCH transmission in slot #k 308, all of slot candidates capable of PDSCH-to-HARQ-ACK timing which can indicate slot #k 308 are considered. Referring to FIG. 3, it is assumed that only the PDSCHs scheduled in slot #n 302, slot #n+1 304, and slot #n+2 306 can be used for HARQ-ACK transmission in slot #k 308 by a possible combination of the PDSCH-to-HARQ-ACK timing. In addition, the maximum number of PDSCHs which can be scheduled for each slot is derived in consideration of time domain resource configuration information of PDSCHs which can be scheduled in the slots 302, 304, and 306, respectively, and information indicating whether symbols in the slots are downlink or uplink symbols. For example, when the maximum scheduling is possible for 2 PDSCHs in the slot 302, 3 PDSCHs in the slot 304, and 2 PDSCHs in the slot 306, the maximum number of PDSCHs included in a HARQ-ACK codebook transmitted from the slot 308 is 7 in total. This is referred to as cardinality of the HARQ-ACK codebook.

Figure 4:
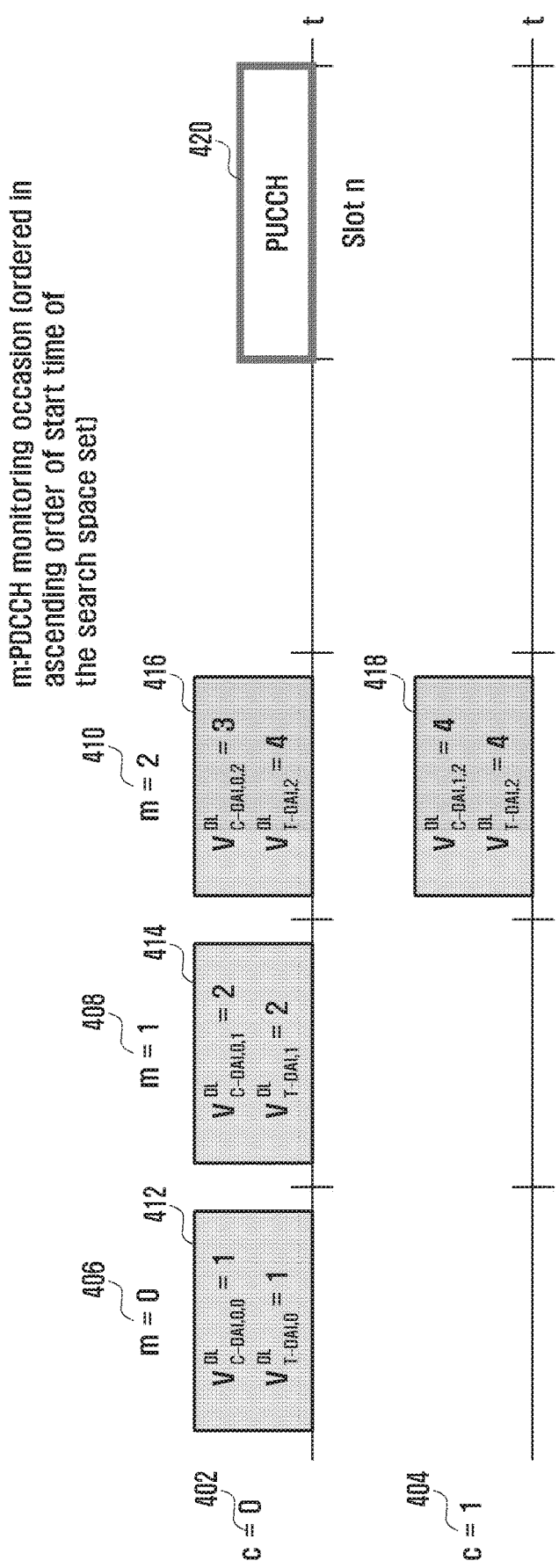
FIG. 4 illustrates a method for configuring a dynamic HARQ-ACK codebook in an NR system according to an embodiment of the disclosure.

FIG. 4 illustrates a method for configuring a dynamic HARQ-ACK codebook in an NR system according to an embodiment of the disclosure.

Referring to FIG. 4, a terminal transmits HARQ-ACK information transmitted in one PUCCH in the corresponding slot n, based on a PDSCH-to-HARQ_feedback timing value for PUCCH transmission of HARQ-ACK information in slot n for PDSCH reception or SPS PDSCH release and K0, which is transmission slot position information of a PDSCH scheduled by DCI format 1_0 or 1_1. Specifically, in order to transmit the above-described HARQ-ACK information, the terminal determines a HARQ-ACK codebook of the PUCCH transmitted from the slot determined by the PDSCH-to-HARQ_feedback timing and K0, based on DAI included in DCI indicating PDSCH or SPS PDSCH release.

The DAI is configured by counter DAI and total DAI. The counter DAI is information in which HARQ-ACK information corresponding to a PDSCH scheduled by DCI format 1_0 or DCI format 1_1 indicates a position in the HARQ-ACK codebook. Specifically, a value of the counter DAI in DCI format 1_0 or 1_1 indicates a cumulative value of SPS PDSCH release or PDSCH reception scheduled by DCI format 1_0 or DCI format 1_1 in specific cell c. The accumulated value is configured based on a serving cell and a PDCCH monitoring occasion where the scheduled DCI exists.

The total DAI is a value indicating the size of the HARQ-ACK codebook. Specifically, a value of total DAI refers to the total number of SPS PDSCH releases or previously scheduled PDSCHs including a time point when the DCI is scheduled. In addition, the total DAI is a parameter used when HARQ-ACK information in serving cell c also includes HARQ-ACK information for a PDSCH scheduled in another cell including the serving cell c in a carrier aggregation (CA) situation. In other words, there is no total DAI parameter in a system operating with one cell.

An example of an operation for the DAI is shown in FIG. 4. FIG. 4 shows a change in the values of counter DAI (C-DAI) and total DAI (T-DAI) indicated by DCI discovered for at each PDCCH monitoring occasion configured for each carrier, when the terminal transmits a HARQ-ACK codebook selected based on the DAI in a n-th slot of carrier 0 402 to a PUCCH 420 in a situation in which two carriers are configured. First, in the DCI discovered at m=0 406, each of the C-DAI and T-DAI indicates a value 412 of 1. In the DCI discovered at m=1 408, each of the C-DAI and T-DAI indicates a value 414 of 2. In the DCI discovered in carrier 0 (c=0) 402 of m=2 410, the C-DAI indicates a value 416 of 3. In the DCI discovered in carrier 1 (c=1) 404 of m=2 410, the C-DAI indicates a value 418 of 4. In this case, when carriers 0 and 1 are scheduled in the same monitoring occasion, all of the T-DAIs are indicated as 4.

Referring to FIGS. 3 and 4, the HARQ-ACK codebook determination is operated in a situation in which only one PUCCH including HARQ-ACK information is transmitted in one slot. This is referred to as mode 1. As an example of a method in which one PUCCH transmission resource is determined in one slot, when PDSCHs scheduled in different DCIs are multiplexed with one HARQ-ACK codebook and transmitted in the same slot, a PUCCH resource selected for HARQ-ACK transmission is determined as a PUCCH resource indicated by a PUCCH resource field indicated by DCI in which a PDSCH is lastly scheduled. That is, a PUCCH resource indicated by a PUCCH resource field indicated by DCI scheduled before the DCI is ignored.

The following description defines methods and apparatuses for determining a HARQ-ACK codebook in a situation in which two or more PUCCHs including HARQ-ACK information can be transmitted in one slot. This is referred to as mode 2. A terminal may be able to operate only in mode 1 (transmit only one HARQ-ACK PUCCH in one slot) or in mode 2 (transmit one or more HARQ-ACK PUCCHs in one slot). Alternatively, a terminal supporting both mode 1 and mode 2 may configure such that a base station operates only in one mode by higher layer signaling, or implicitly determine mode 1 and mode 2 by DCI format, RNTI, a DCI specific field value, scrambling, and the like. For example, a PDSCH scheduled by DCI format A and HARQ-ACK information associated therewith are based on mode 1, and a PDSCH scheduled by DCI format B and HARQ-ACK information associated therewith are based on mode 2.

Next, provided is an operation method of a terminal in a case where a terminal performs one or more HARQ-ACK transmissions in one slot, one or more PUCCHs including HARQ-ACK are transmitted in one slot, and the PUCCHs overlap, in a specific OFDM symbol, with another PUCCH including channel information or scheduling request information, that is, a PUCCH and a PUCCH collide with each other. In addition, provided is an operation method of a terminal in a case where the PUCCHs and a PUSCH for transmitting uplink data information are overlappingly transmitted in a specific OFDM symbol, that is, a PUCCH and a PUSCH collide with each other.

Embodiment 1

Figure 5:
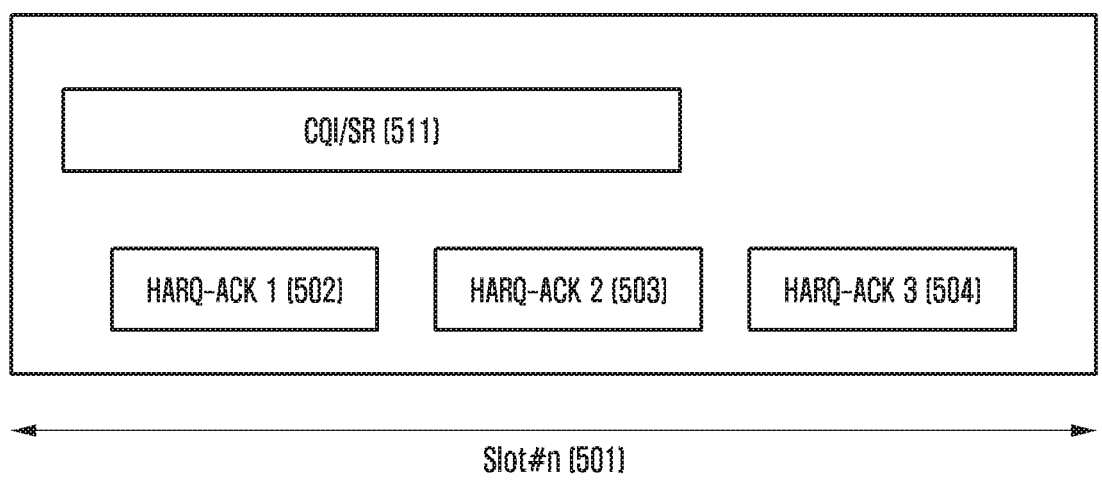
FIG. 5 illustrates a method in a case where a physical uplink control channel (PUCCH) and another PUCCH collide with each other in one slot according to an embodiment of the disclosure.

FIG. 5 shows embodiment 1 in a case where one or more PUCCHs including HARQ-ACK are transmitted in one slot, and the PUCCHs overlap, in a specific OFDM symbol, with another PUCCH including channel information or scheduling request information, that is, a PUCCH and a PUCCH collide with each other according to an embodiment of the disclosure.

Referring to FIG. 5, first, a terminal receives simultaneousHARQ-ACK-CSI from a base station through a higher layer signal. When a collision between a PUCCH including CQI/SR and a PUCCH including HARQ-ACK occurs in a specific OFDM symbol, as in embodiment 1 of the disclosure, the terminal which receives the higher layer signal attempts a method to be described in the disclosure to multiplex uplink control information such as the CQI/SR and the HARQ-ACK. If the terminal fails to receive simultaneousHARQ-ACK-CSI from the base station through a higher layer signal, the terminal may drop the CQI. If the terminal transmits a positive SR, the terminal may multiplex the SR with the HARQ-ACK. If the terminal transmits a negative SR, the terminal may transmit only the HARQ-ACK.

Referring to FIG. 5, the terminal receives configuration from the base station in advance through the higher layer signal, with respect to a transmission occasion for a CQI/SR 511, a transmission resource, a parameter related to transmission, and information to be transmitted. Therefore, the terminal is required to transmit the CQI/SR 511 in slot #n, and is aware of a time resource and a frequency resource required to perform transmission. In addition, the terminal determines a PUCCH resource set according to the information bit size of HARQ-ACK 1 502, and is aware of a time resource and a frequency resource required to transmit HARQ-ACK 1 502 from a PUCCH resource determined by a PDCCH resource or a specific field through a PDCCH.

Next, the terminal receives a PDSCH corresponding to HARQ-ACK 1 502 before slot #n 501, and determines whether a processing time required to decode the PDSCH and prepare for transmission of HARQ-ACK 1 502, that is, a value, obtained by adding the processing time after the last symbol of the PDSCH, is located before the first symbol of a transmission time resource of the CQI/SR 511. Otherwise, the terminal may not be required to determine the processing time for HARQ-ACK 1 502. The reason is that the base station is required to schedule the PDSCH corresponding to HARQ-ACK 1 502 in consideration of the processing time for HARQ-ACK 1 502 and the first symbol of the time resource of the CQI/SR 511. Otherwise, the terminal may determine the case as an error. In this case, the base station cannot predict a procedure to be applied by the terminal for the case, and a terminal procedure may be terminal implementation.

The processing time is given as a constant value after the last symbol of the PDSCH, wherein the constant value T is $(N1+d\_11+1)*(2048+144)*k*2^{(-u)}*T\_c$. N1 is a value related to processing capability of the terminal, and is a constant determined based on sub-carrier spacing (u) of the PDCCH or PDSCH. d_11 is a constant determined based on the number of PDSCH symbols. K=64, and T_c is the basic time unit of NR and is $1/(480*10^3*4096)$.

If it is determined that the value, obtained by adding the processing time after the last symbol of the PDSCH, is located before the first symbol of the transmission time resource of the CQI/SR 511, or without the above determination, the terminal selects a PUCCH resource set as the size of the sum of information bits of the CQI/SR 511 and HARQ-ACK 1 502. Subsequently, the terminal determines a new time resource and frequency resource A of a PUCCH required to transmit the CQI/SR 511 and HARQ-ACK 1 502 from the PUCCH resource determined by the PDCCH resource or the specific field through the PDCCH. Next, the terminal determines a PUCCH resource set according to the information bit size of HARQ-ACK 2 503, and is aware of a time resource and a frequency resource required to transmit HARQ-ACK 2 503 from the PUCCH resource determined by the PDCCH resource or the specific field through the PDCCH.

A case in which the resource A does not overlap with HARQ-ACK 2 503 in a specific OFDM symbol will be described. In order to multiplex HARQ-ACK 2 503 with the CQI/SR 511 and HARQ-ACK 1 502, the terminal does not determine whether, in the frequency resource A, a processing time for HARQ-ACK 2 503, that is, a processing time required to decode the PDSCH and prepare for transmission of HARQ-ACK 2 503 is located before a time resource of the frequency resource A. That is, the terminal transmits the CQI/SR 511 and HARQ-ACK 1 502 through the PUCCH of the resource A, determines a PUCCH resource set of HARQ-ACK 2 503 according to the information bit size of HARQ-ACK 2 503, and transmits HARQ-ACK 2 503 through a separate PUCCH through a time resource and a frequency resource required to transmit HARQ-ACK 2 503 from a PUCCH resource determined by a PDCCH resource or a specific field through a PDCCH.

Next, a case in which the resource A overlaps with HARQ-ACK 2 503 in a specific OFDM symbol will be described. When the resource A and a resource of HARQ-ACK 2 503 overlap with each other in a specific OFDM symbol, the terminal does not perform the procedure of multiplexing the CQI/SR 511 and HARQ-ACK 1 502, and may drop the CQI/SR 511. Alternatively, the terminal may perform transmission by dropping only the CQI and multiplexing the SR with HARQ-ACK 1. Therefore, when the SR is a positive SR, the terminal determines a PUCCH resource set for transmitting HARQ-ACK 1 502 or HARQ-ACK 1 502 and the SR, according to the information bit size of HARQ-ACK 1 502 or the sum of HARQ-ACK 1 502 and the SR. Subsequently, the terminal transmits HARQ-ACK 1 502 or HARQ-ACK 1 and the SR by using a PUCCH in a time resource and a frequency resource required to transmit HARQ-ACK 1 502 or HARQ-ACK 1 and the SR from a PUCCH resource determined by a PDCCH resource or a specific field through a PDCCH. In addition, the terminal determines a PUCCH resource set of HARQ-ACK 2 503 according to the information bit size of HARQ-ACK 2 503, and transmits HARQ-ACK 2 503 through a separate PUCCH through a time resource and a frequency resource required to transmit HARQ-ACK 2 503 from the PUCCH resource determined by the PDCCH resource or the specific field through the PDCCH.

As in embodiment 1 described above, a plurality of HARQ-ACKs are transmitted in one slot via a separate PUCCH through the terminal procedure, so that if there is an urgent downlink data transmission such as URLLC, it is possible to satisfy a latency condition of the URLLC by directly providing HARQ-ACK feedback.

If HARQ-ACK 3 504 exists, the terminal may repeat the procedures performed in HARQ-ACK 2 503, and thus apply the procedures to HARQ-ACK 3 504. The procedures may be equally applied to the case where there are N, which is 3 or more, number of HARQ-ACKs to be transmitted in slot n 501.

Embodiment 2

Figure 6:
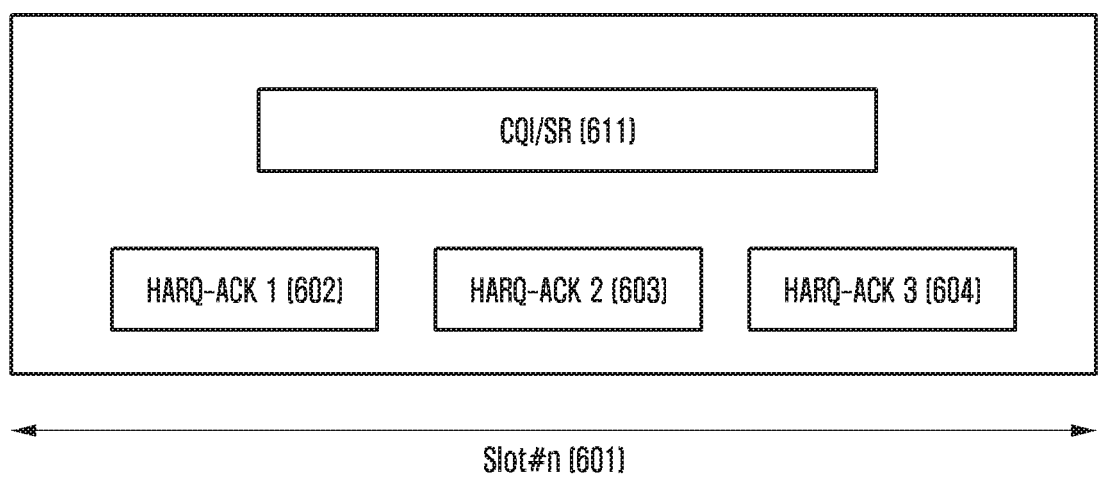
FIG. 6 illustrates a method in a case where a PUCCH and another PUCCH collide with each other in one slot according to an embodiment of the disclosure.

FIG. 6 shows embodiment 2 in a case where one or more PUCCHs including HARQ-ACK are transmitted in one slot, and the PUCCHs overlap, in a specific OFDM symbol, with another PUCCH including channel information or scheduling request information, that is, a PUCCH and a PUCCH collide with each other according to an embodiment of the disclosure.

Referring to FIG. 6, first, a terminal receives simultaneousHARQ-ACK-CSI from a base station through a higher layer signal. When a collision between a PUCCH including HARQ-ACK and a PUCCH including CQI/SR occurs in a specific OFDM symbol, as in embodiment 2 of the disclosure, the terminal which receives the higher layer signal attempts a method to be described in the disclosure to multiplex uplink control information such as the HARQ-ACK and the CQI/SR. If the terminal fails to receive simultaneousHARQ-ACK-CSI from the base station through a higher layer signal, the terminal may drop the CQI. If the terminal transmits a positive SR, the terminal may multiplex the SR with the HARQ-ACK. If the terminal transmits a negative SR, the terminal may transmit only the HARQ-ACK.

Referring to FIG. 6, the terminal receives configuration from the base station in advance through the higher layer signal, with respect to a transmission occasion for a CQI/SR 611, a transmission resource, a parameter related to transmission, and information to be transmitted. Therefore, the terminal is required to transmit the CQI/SR 611 in slot #n, and is aware of a time resource and a frequency resource required to perform transmission. In addition, the terminal determines a PUCCH resource set according to the information bit size of HARQ-ACK 1 602, and is aware of a time resource and a frequency resource required to transmit HARQ-ACK 1 602 from a PUCCH resource determined by a PDCCH resource or a specific field through a PDCCH.

Next, the terminal receives a PDSCH corresponding to HARQ-ACK 1 602 before slot #n 601, and determines whether a processing time required to decode the PDSCH and prepare for transmission of HARQ-ACK 1 602, that is, a value, obtained by adding the processing time after the last symbol of the PDSCH, is located before the first symbol of a transmission time resource of the CQI/SR 611. Otherwise, the terminal may not be required to determine the processing time for HARQ-ACK 1 602. The reason is that the base station is required to schedule the PDSCH corresponding to HARQ-ACK 1 602 in consideration of the processing time for HARQ-ACK 1 602 and the first symbol of the time resource of the CQI/SR 611. Otherwise, the terminal may determine the case as an error. In this case, the base station cannot predict a procedure to be applied by the terminal for the case, and a terminal procedure may be terminal implementation.

The processing time is given as a constant value after the last symbol of the PDSCH, and the constant value T is $(N1+d\_11+1)*(2048+144)*k*2^{(-u)}*T\_c$. N1 is a value related to processing capability of the terminal, and is a constant determined based on sub-carrier spacing (u) of the PDCCH or PDSCH. d_11 is a constant determined based on the number of PDSCH symbols. K=64, and T_c is the basic time unit of NR and is $1/(480*10^3*4096)$.

If it is determined that the value, obtained by adding the processing time after the last symbol of the PDSCH, is located before the first symbol of the transmission time resource of the CQI/SR 611, or without the above determination, the terminal selects a PUCCH resource set as the size of the sum of information bits of the CQI/SR 611 and HARQ-ACK 1 602. Subsequently, the terminal determines a new time resource and frequency resource A of a PUCCH required to transmit the CQI/SR 611 and HARQ-ACK 1 602 from the PUCCH resource determined by the PDCCH resource or the specific field through the PDCCH. Next, the terminal determines a PUCCH resource set according to the information bit size of HARQ-ACK 2 603, and is aware of a time resource and a frequency resource required to transmit HARQ-ACK 2 603 from the PUCCH resource determined by the PDCCH resource or the specific field through the PDCCH.

A case in which the resource A does not overlap with HARQ-ACK 2 603 in a specific OFDM symbol will be described. In order to multiplex HARQ-ACK 2 603 with the CQI/SR 611 and HARQ-ACK 1 602, the terminal does not determine whether, in the frequency resource A, a processing time for HARQ-ACK 2 603, that is, a processing time required to decode the PDSCH and prepare for transmission of HARQ-ACK 2 603 is located before a time resource of the frequency resource A. That is, the terminal transmits the CQI/SR 611 and HARQ-ACK 1 602 through the PUCCH of the resource A, determines a PUCCH resource set of HARQ-ACK 2 603 according to the information bit size of HARQ-ACK 2 603, and transmits HARQ-ACK 2 603 through a separate PUCCH through a time resource and a frequency resource required to transmit HARQ-ACK 2 603 from a PUCCH resource determined by a PDCCH resource or a specific field through a PDCCH.

Next, a case in which the resource A overlaps with HARQ-ACK 2 603 in a specific OFDM symbol will be described. When the resource A and HARQ-ACK 2 603 overlap with each other in a specific OFDM symbol, the terminal does not perform the above procedure of multiplexing the CQI/SR 611 and HARQ-ACK 1 602, and may drop the CQI/SR 611. Alternatively, the terminal may perform transmission by dropping only the CQI and multiplexing the SR with HARQ-ACK 1. Therefore, when the SR is a positive SR, the terminal determines a PUCCH resource set for transmitting HARQ-ACK 1 602 or HARQ-ACK 1 602 and the SR, according to the information bit size of HARQ-ACK 1 602 or the sum of HARQ-ACK 1 602 and the SR. Subsequently, the terminal transmits HARQ-ACK 1 602 or HARQ-ACK 1 and the SR by using a PUCCH in a time resource and a frequency resource required to transmit HARQ-ACK 1 602 or HARQ-ACK 1 and the SR from a PUCCH resource determined by a PDCCH resource or a specific field through a PDCCH. In addition, the terminal determines a PUCCH resource set of HARQ-ACK 2 603 according to the information bit size of HARQ-ACK 2 603, and transmits HARQ-ACK 2 603 through a separate PUCCH through a time resource and a frequency resource required to transmit HARQ-ACK 2 603 from the PUCCH resource determined by the PDCCH resource or the specific field through the PDCCH.

As in embodiment 2 described above, a plurality of HARQ-ACKs are transmitted in one slot via a separate PUCCH through the terminal procedure, so that if there is an urgent downlink data transmission such as URLLC, it is possible to satisfy a latency condition of the URLLC by directly providing HARQ-ACK feedback.

If HARQ-ACK 3 604 exists, the terminal may repeat the procedures performed in HARQ-ACK 2 603, and thus apply the procedures to HARQ-ACK 3 604. The procedures may be equally applied to the case where there are N, which is 3 or more, number of HARQ-ACKs to be transmitted in slot n 601.

Embodiment 3

Figure 7:
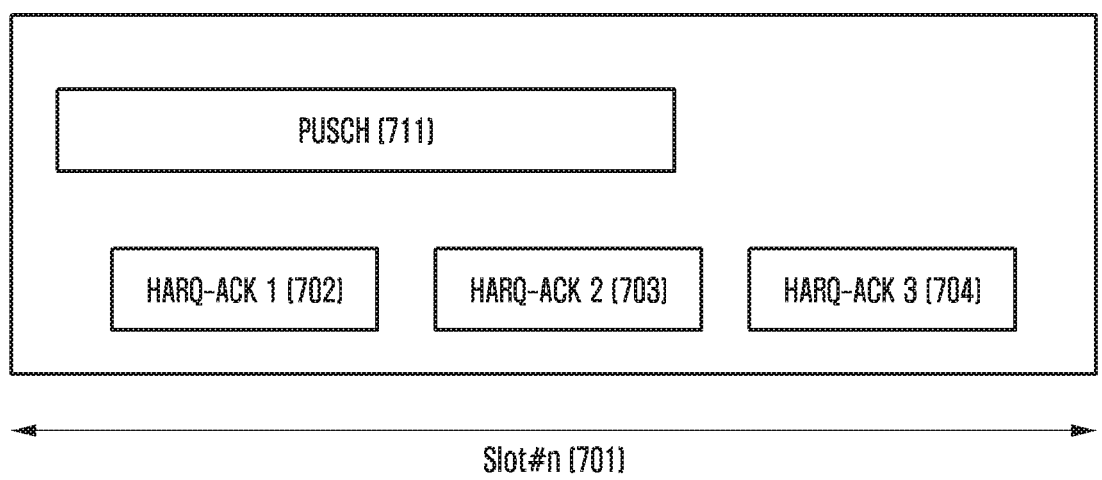
FIG. 7 illustrates a method in a case where a PUCCH and a physical uplink shared channel (PUSCH) collide with each other in one slot according to an embodiment of the disclosure.

FIG. 7 shows embodiment 3 in a case where one or more PUCCHs including HARQ-ACK are transmitted in one slot, and the PUCCHs overlap, in a specific OFDM symbol, with a PUSCH for transmitting uplink data information, that is, a PUCCH and a PUSCH collide with each other according to an embodiment of the disclosure.

Referring to FIG. 7, first, when a terminal has simultaneous PUSCH/PUCCH transmission capability and transmits the capability to a base station, the terminal may receive simultaneousPUSCH-PUCCH from the base station through a higher layer signal.

When a collision between a PUCCH including HARQ-ACK and a PUSCH required to transmit a shared channel (UL-SCH) occurs in a specific OFDM symbol, as in embodiment 3 of the disclosure, the terminal having received the higher layer signal can transmit the PUCCH and the PUSCH at the same time. If the terminal does not have a simultaneous PUSCH/PUCCH transmission capability or has a simultaneous PUSCH/PUCCH transmission capability but has not received simultaneousPUSCH-PUCCH from the base station through a higher layer signal even after transmitting the capability to the base station, the terminal may transmit a PUCCH and drop a PUSCH. Alternatively, the terminal may transmit a channel prioritized according to the service type of the terminal, and may drop the remaining channels. The above service type or priority may be received by the terminal from a CORESET or search space having a priority or a PDCCH having a priority or a specific field of a PDCCH transmitted by the base station.

Referring to FIG. 7, the terminal receives a transmission resource for a PUSCH 711 and a parameter related to transmission from the base station through a higher layer signal and a PDCCH. In addition, the terminal determines a PUCCH resource set according to the information bit size of HARQ-ACK 1 702, and is aware of a time resource and a frequency resource required to transmit HARQ-ACK 1 702 from a PUCCH resource determined by a PDCCH resource or a specific field through a PDCCH.

Next, the terminal receives a PDSCH corresponding to HARQ-ACK 1 702 before slot #n 701, and determines whether a processing time required to decode the PDSCH and prepare for transmission of HARQ-ACK 1 702, that is, a value, obtained by adding the processing time after the last symbol of the PDSCH, is located before the first symbol of a transmission time resource of the PUSCH 711.

The processing time is given as a constant value after the last symbol of the PDSCH, and the constant value T is $(N1+d\_11+1)*(2048+144)*k*2^{(-u)}*T\_c$. N1 is a value related to processing capability of the terminal, and is a constant determined based on sub-carrier spacing (u) of the PDCCH or PDSCH. d_11 is a constant determined based on the number of PDSCH symbols. K=64, and T_c is the basic time unit of NR and is $1/(480*10^3*4096)$.

If it is determined that the value, obtained by adding the processing time after the last symbol of the PDSCH, is located before the first symbol of the transmission time resource of the PUSCH 711, the terminal multiplexes HARQ-ACK 1 702 with the PUSCH 711. Next, the terminal determines a PUCCH resource set for transmitting HARQ-ACK 2 703 according to the information bit size of HARQ-ACK 2 703. The terminal is aware of a time resource and a frequency resource required to transmit HARQ-ACK 2 703 from a PUCCH resource determined by a PDCCH resource or a specific field through a PDCCH.

A case where the PUSCH 711 does not overlap with HARQ-ACK 2 703 in a specific OFDM symbol, or a case where the terminal receives simultaneousPUSCH-PUCCH even when the PUSCH 711 overlaps with HARQ-ACK 2 703 in a specific OFDM symbol will be described. In this case, in order to multiplex HARQ-ACK 2 703 with the PUSCH 711, the terminal does not determine whether a processing time for a resource of the PUSCH 711 and HARQ-ACK 2 703, that is, a processing time required to decode the PDSCH and prepare for transmission of HARQ-ACK 2 703 is located before a time resource of the PUSCH 711. That is, the terminal transmits the PUSCH multiplexed with HARQ-ACK 1 702 in a resource of the PUSCH 711. In addition, the terminal determines a PUCCH resource set of HARQ-ACK 2 703 according to the information bit size of HARQ-ACK 2 703, and transmits HARQ-ACK 2 703 through a separate PUCCH through a time resource and a frequency resource required to transmit HARQ-ACK 2 703 from a PUCCH resource determined by a PDCCH resource or a specific field through a PDCCH.

Next, a case in which the PUSCH 711 overlaps with HARQ-ACK 2 703 in a specific OFDM symbol will be described. That is, if the terminal fails to receive simultaneousPUSCH-PUCCH, or does not have simultaneous PUSCH/PUCCH capability, the terminal does not perform the above procedure of multiplexing the PUSCH 711 and HARQ-ACK 1 702, and may drop the PUSCH 711. Therefore, the terminal determines a PUCCH resource set according to the information bit size of HARQ-ACK 1 702, and transmits HARQ-ACK 1 702 by using a PUCCH in a time resource and a frequency resource required to transmit HARQ-ACK 1 702 from a PUCCH resource determined by a PDCCH resource or a specific field through a PDCCH. In addition, the terminal determines a PUCCH resource set according to the information bit size of HARQ-ACK 2 703, and transmits HARQ-ACK 2 703 through a separate PUCCH through a time resource and a frequency resource required to transmit HARQ-ACK 2 703 from the PUCCH resource determined by the PDCCH resource or the specific field through the PDCCH. In the above, an example of dropping the PUSCH and transmitting HARQ-ACK 1 702 and HARQ-ACK 2 703 has been described, but the terminal may transmit the PUSCH 711 when a prioritized channel is the PUSCH 711 according to the service type of the terminal, and may drop PUCCHs which are the remaining channels.

As in embodiment 3 described above, a plurality of HARQ-ACKs are transmitted in one slot via a separate PUCCH through a terminal procedure, so that if there is an urgent downlink data transmission such as URLLC, it is possible to satisfy a latency condition of the URLLC by directly providing HARQ-ACK feedback.

If HARQ-ACK 3 704 exists, the terminal may repeat the procedures performed in HARQ-ACK 2 703, and thus apply the procedures to HARQ-ACK 3 704. The procedures may be equally applied to the case where there are N, which is 3 or more, number of HARQ-ACKs to be transmitted in slot n 701.

Embodiment 4

Figure 8:
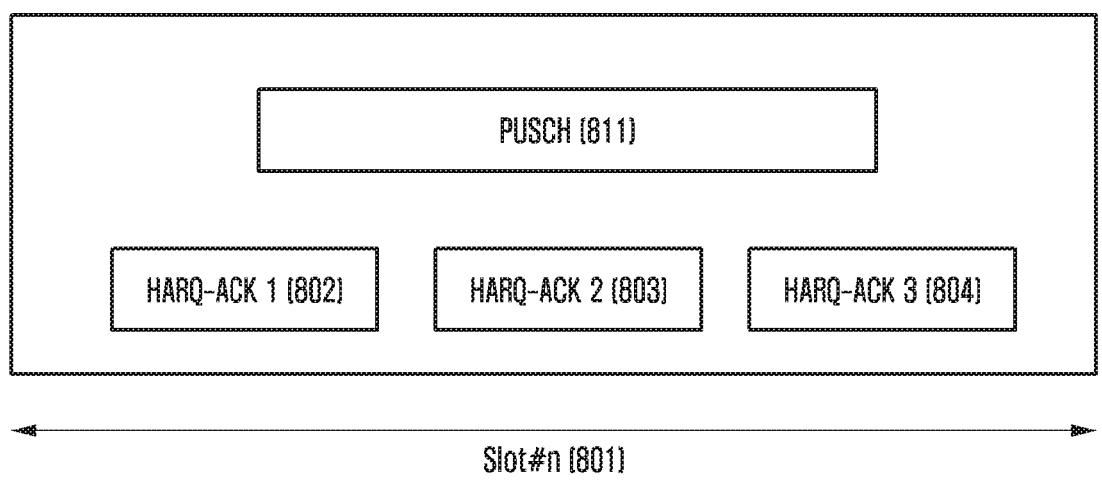
FIG. 8 illustrates a method in a case where a PUCCH and a PUSCH collide with each other in one slot according to an embodiment of the disclosure.

FIG. 8 shows embodiment 4 in a case where one or more PUCCHs including HARQ-ACK are transmitted in one slot, and the PUCCHs overlap, in a specific OFDM symbol, with a PUSCH for transmitting uplink data information, that is, a PUCCH and a PUSCH collide with each other according to an embodiment of the disclosure.

Referring to FIG. 8, first, when a terminal has simultaneous PUSCH/PUCCH transmission capability and transmits the capability to a base station, the terminal may receive simultaneousPUSCH-PUCCH from the base station through a higher layer signal.

When a collision between a PUSCH required to transmit a UL-SCH and a PUCCH including HARQ-ACK occurs in a specific OFDM symbol, as in embodiment 4 of the disclosure, the terminal having received the higher layer signal can transmit the PUCCH and the PUSCH at the same time. If the terminal does not have a simultaneous PUSCH/PUCCH transmission capability or has a simultaneous PUSCH/PUCCH transmission capability but has not received simultaneousPUSCH-PUCCH from the base station through a higher layer signal even after transmitting the capability to the base station, the terminal may transmit a PUCCH and drop a PUSCH. Alternatively, the terminal may transmit a channel prioritized according to the service type of the terminal, and may drop the remaining channels. The above service type or priority may be received by the terminal from a CORESET or search space having a priority or a PDCCH having a priority or a specific field of a PDCCH transmitted by the base station.

Referring to FIG. 8, the terminal receives a transmission resource for a PUSCH 811 and a parameter related to transmission from the base station through a higher layer signal and a PDCCH. In addition, the terminal determines a PUCCH resource set according to the information bit size of HARQ-ACK 1 802, and is aware of a time resource and a frequency resource required to transmit HARQ-ACK 1 802 from a PUCCH resource determined by a PDCCH resource or a specific field through a PDCCH.

Next, the terminal receives a PDCCH for scheduling the PUSCH 811 before slot #n 801, and determines whether a processing time required to decode the PDDCH and prepare for transmission of the PUSCH 811, that is, a value, obtained by adding the processing time after the last symbol of the PDDCH, is located before the first symbol of a transmission time resource of HARQ-ACK 1 802.

The processing time is given as a constant value after the last symbol of the PDCCH, and the constant value T is $\max\{(N2+d\_21+1)*(2048+144)*k*2^{(-u)}*T\_c, d\_22\}$. N2 is a value related to processing capability of the terminal, and is a constant determined based on sub-carrier spacing (u) of the PDCCH or PUSCH. d_21 is a constant determined based on whether the first symbol of the PUSCH is configured by a DMRS only. K=64, and T_c is the basic time unit of NR and is $1/(480*10^3*4096)$. d_22 is a constant related to the switching of a BWP.

If it is determined that the value, obtained by adding the processing time after the last symbol of the PDCCH for scheduling the PUSCH, is located before the first symbol of the transmission time resource of HARQ-ACK 1 802, the terminal multiplexes HARQ-ACK 1 802 with the PUSCH 811. Next, the terminal determines a PUCCH resource set for transmitting HARQ-ACK 2 803 according to the information bit size of HARQ-ACK 2 803. The terminal is aware of a time resource and a frequency resource required to transmit HARQ-ACK 2 803 from a PUCCH resource determined by a PDCCH resource or a specific field through a PDCCH.

A case where the PUSCH 811 does not overlap with HARQ-ACK 2 803 in a specific OFDM symbol, or a case where the terminal receives simultaneousPUSCH-PUCCH even when the PUSCH 811 overlaps with HARQ-ACK 2 803 in a specific OFDM symbol will be described. In this case, the terminal transmits the PUSCH multiplexed with HARQ-ACK 1 802 in a resource of the PUSCH 811. In addition, the terminal determines a PUCCH resource set of HARQ-ACK 2 803 according to the information bit size of HARQ-ACK 2 803, and transmits HARQ-ACK 2 803 through a separate PUCCH through a time resource and a frequency resource required to transmit HARQ-ACK 2 803 from a PUCCH resource determined by a PDCCH resource or a specific field through a PDCCH.

Next, a case in which the PUSCH 811 overlaps with HARQ-ACK 2 803 in a specific OFDM symbol will be described. That is, if the terminal fails to receive simultaneous PUSCH-PUCCH, or does not have simultaneous PUSCH/PUCCH capability, the terminal does not perform the above procedure of multiplexing the PUSCH 811 and HARQ-ACK 1 802, and may drop the PUSCH 811. Therefore, the terminal determines a PUCCH resource set according to the information bit size of HARQ-ACK 1 802, and transmits HARQ-ACK 1 802 by using a PUCCH in a time resource and a frequency resource required to transmit HARQ-ACK 1 802 from a PUCCH resource determined by a PDCCH resource or a specific field through a PDCCH. In addition, the terminal determines a PUCCH resource set according to the information bit size of HARQ-ACK 2 803, and transmits HARQ-ACK 2 803 through a separate PUCCH through a time resource and a frequency resource required to transmit HARQ-ACK 2 803 from the PUCCH resource determined by the PDCCH resource or the specific field through the PDCCH. In the above, an example of dropping the PUSCH and transmitting HARQ-ACK 1 802 and HARQ-ACK 2 803 has been described, but the terminal may transmit the PUSCH 811 when a prioritized channel is the PUSCH 811 according to the service type of the terminal, and may drop PUCCHs which are the remaining channels.

As in embodiment 4 described above, a plurality of HARQ-ACKs are transmitted in one slot via a separate PUCCH through a terminal procedure, so that if there is an urgent downlink data transmission such as URLLC, it is possible to satisfy a latency condition of the URLLC by directly providing HARQ-ACK feedback.

If HARQ-ACK 3 804 exists, the terminal may repeat the procedures performed in HARQ-ACK 2 803, and thus apply the procedures to HARQ-ACK 3 804. The procedures may be equally applied to the case where there are N, which is 3 or more, number of HARQ-ACKs to be transmitted in slot n 801.

Figure 9:
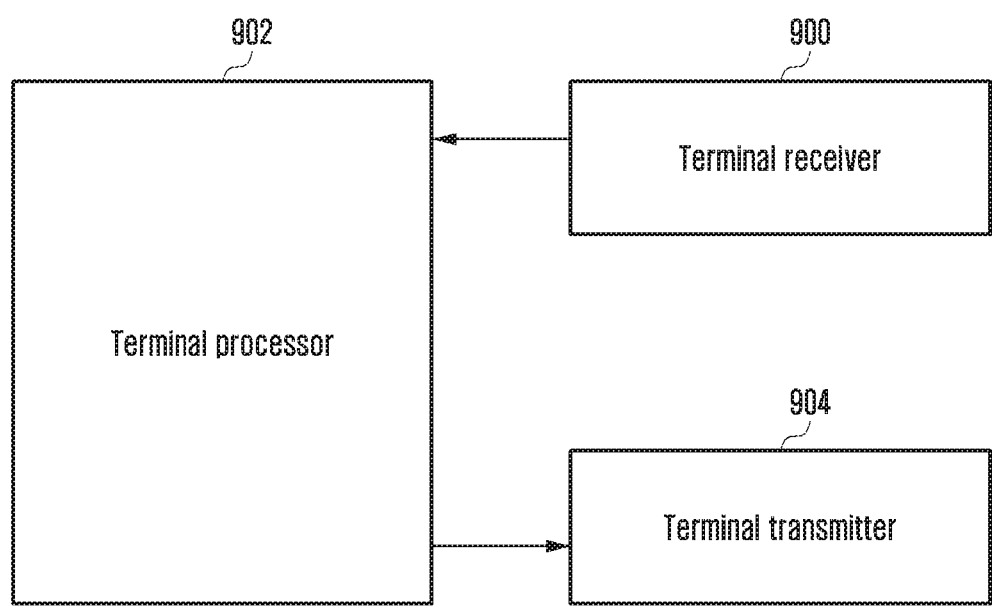
FIG. 9 is a block diagram showing a structure of a terminal according to an embodiment of the disclosure.

FIG. 9 is a block diagram showing a structure of a terminal according to an embodiment of the disclosure.

Referring to FIG. 9, a terminal of the disclosure may include a terminal receiver 900, a terminal transmitter 904, and a terminal processor 902. The terminal receiver 900 and the terminal transmitter 904 may be collectively referred to as a transceiver in an embodiment. The transceiver may transmit or receive a signal to or from a base station. The signal may include control information and data. To this end, the transceiver may include an RF transmitter configured to up-convert and amplify a frequency of a transmitted signal, and an RF receiver configured to amplify a received signal with low noise, and down-convert a frequency of the signal. In addition, the transceiver may receive a signal through a wireless channel, output the signal to the terminal processor or controller 902, and transmit the signal output from the terminal processor 902 through the wireless channel. The terminal processor 902 may control a series of processes such that the terminal can operate according to the above-described embodiments.

Figure 10:
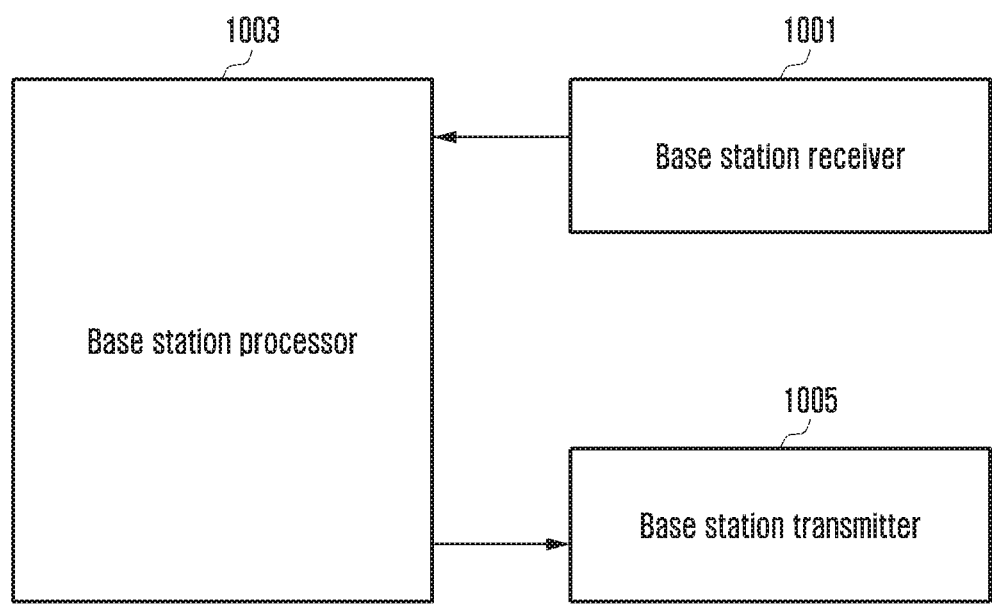
FIG. 10 is a block diagram showing a structure of a base station according to an embodiment of the disclosure.

FIG. 10 is a block diagram showing a structure of a base station according to an embodiment of the disclosure.

Referring to FIG. 10, in an embodiment, a base station may include at least one of a base station receiver 1001, a base station transmitter 1005, and a base station processor 1003. The base station receiver 1001 and the base station transmitter 1005 may be collectively referred to as a transceiver in an embodiment. The transceiver may transmit or receive a signal to or from a terminal. The signal may include control information and data. To this end, the transceiver may include an RF transmitter configured to up-convert and amplify a frequency of a transmitted signal, and an RF receiver configured to amplify a received signal with low noise, and down-convert a frequency of the signal. In addition, the transceiver may receive a signal through a wireless channel, output the signal to the base station processor or controller 1003, and transmit the signal output from the base station processor 1003 through the wireless channel. The base station processor 1003 may control a series of processes such that the base station can operate according to the above-described embodiments.

Meanwhile, the embodiments of the disclosure disclosed in the specification and drawings are merely to provide a specific example to easily describe the technical contents of the disclosure and to help understanding of the disclosure, and are not intended to limit the scope of the disclosure. That is, it is obvious to a person skilled in the art to which the disclosure belongs that other modifications based on the technical idea of the disclosure can be implemented. In addition, each of the above embodiments may be operated in combination with each other as necessary. For example, portions of embodiment 1, embodiment 2, and embodiment 3 of the disclosure may be combined with each other to operate a base station and a terminal. In addition, although the above embodiments have been presented based on the NR system, other modifications based on the technical idea of the above embodiments can be implemented in other systems such as an FDD or time division duplex (TDD) LTE system.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, information configuring simultaneous transmission of hybrid automatic repeat request acknowledgement (HARQ-ACK) and channel state information (CSI);
   identifying whether a timing obtained by adding a processing time of the terminal after a last symbol of a physical downlink shared channel (PDSCH) reception is before a first symbol of a first physical uplink control channel (PUCCH) resource for a channel quality information (CQI) and a scheduling request (SR), based on the information;
   in case that the timing is before the first symbol of the first PUCCH resource, identifying an uplink resource for transmitting a first HARQ-ACK corresponding to the PDSCH reception, the CQI, and the SR;
   identifying whether the uplink resource overlaps with a second PUCCH resource for a second HARQ-ACK; and
   transmitting, to the base station, the first HARQ-ACK, the CQI, and the SR on the uplink resource, and the second HARQ-ACK on the second PUCCH resource, in case that the uplink resource does not overlap with the second PUCCH resource.

2. The method of claim 1, further comprising:
identifying the uplink resource based on a summed information bit size of the first HARQ-ACK, the CQI, and the SR.

3. The method of claim 1, further comprising:
transmitting, to the base station, the first HARQ-ACK on a third PUCCH resource by dropping the CQI and the SR, and the second HARQ-ACK on the second PUCCH resource, in case that at least one symbol of the uplink resource overlaps with the second PUCCH resource.

4. A method performed by a base station in a wireless communication system, the method comprising:
transmitting, to a terminal, information configuring simultaneous transmission of hybrid automatic repeat request acknowledgement (HARQ-ACK) and channel state information (CSI);
identifying whether a timing obtained by adding a processing time of the terminal after a last symbol of a physical downlink shared channel (PDSCH) transmission is before a first symbol of a first physical uplink control channel (PUCCH) resource for a channel quality information (CQI) and a scheduling request (SR), based on the information;
in case that the timing is before the first symbol of the first PUCCH resource, identifying an uplink resource for receiving a first HARQ-ACK corresponding to the PDSCH transmission, the CQI, and the SR; and
receiving, from the terminal, the first HARQ-ACK, the CQI, and the SR on the uplink resource, and a second HARQ-ACK on a second PUCCH resource, in case that the uplink resource does not overlap with the second PUCCH resource.

5. The method of claim 4, wherein the uplink resource is identified based on a summed information bit size of the first HARQ-ACK, the CQI, and the SR.

6. The method of claim 4, further comprising:
receiving, from the terminal, the first HARQ-ACK on a third PUCCH resource without the CQI and the SR, and the second HARQ-ACK on the second PUCCH resource, in case that at least one symbol of the uplink resource overlaps with the second PUCCH resource.

7. A terminal in a wireless communication system, the terminal comprising:
a transceiver configured to transmit or receive a signal; and
a controller configured to:
receive, from a base station, information configuring simultaneous transmission of hybrid automatic repeat request acknowledgement (HARQ-ACK) and channel state information (CSI),
identify whether a timing obtained by adding a processing time of the terminal after a last symbol of a physical downlink shared channel (PDSCH) reception is before a first symbol of a first physical uplink control channel (PUCCH) resource for a channel quality information (CQI) and a scheduling request (SR), based on the information,
in case that the timing is before the first symbol of the first PUCCH resource, identify an uplink resource for transmitting a first HARQ-ACK corresponding to the PDSCH reception, the CQI, and the SR,
identify whether the uplink resource overlaps with a second PUCCH resource for a second HARQ-ACK, and
transmit, to the base station, the first HARQ-ACK, the CQI, and the SR on the uplink resource, and the second HARQ-ACK on the second PUCCH resource, in case that the uplink resource does not overlap with the second PUCCH resource.

8. The terminal of claim 7, wherein the controller is further configured to identify the uplink resource based on a summed information bit size of the first HARQ-ACK, the CQI, and the SR.

9. The terminal of claim 7, wherein the controller is further configured to transmit, to the base station, the first HARQ-ACK on a third PUCCH resource by dropping the CQI and the SR, and the second HARQ-ACK on the second PUCCH resource, in case that at least one symbol of the uplink resource overlaps with the second PUCCH resource.

10. A base station in a wireless communication system, the base station comprising:
a transceiver configured to transmit or receive a signal; and
a controller configured to:
transmit, to a terminal, information configuring simultaneous transmission of hybrid automatic repeat request acknowledgement (HARQ-ACK) and channel state information (CSI),
identify whether a timing obtained by adding a processing time of the terminal after a last symbol of a physical downlink shared channel (PDSCH) transmission is before a first symbol of a first physical uplink control channel (PUCCH) resource for a channel quality information (CQI) and a scheduling request (SR), based on the information,
in case that the timing is before the first symbol of the first PUCCH resource, identify an uplink resource for receiving a first HARQ-ACK corresponding to the PDSCH transmission, the CQI, and the SR, and
receive, from the terminal, the first HARQ-ACK, the CQI, and the SR on the uplink resource, and a second HARQ-ACK on a second PUCCH resource, in case that the uplink resource does not overlap with the second PUCCH resource.

11. The base station of claim 10, wherein the uplink resource is identified based on a summed information bit size of the first HARQ-ACK, the CQI, and the SR.

12. The base station of claim 11, wherein the controller is further configured to receive, from the terminal, the first HARQ-ACK on a third PUCCH resource without the CQI and the SR, and the second HARQ-ACK on the second PUCCH resource, in case that at least one symbol of the uplink resource overlaps with the second PUCCH resource.

* * * * *